United States Patent
Yamashita et al.

(10) Patent No.: US 9,188,371 B2
(45) Date of Patent: Nov. 17, 2015

(54) AIR-CONDITIONING APPARATUS WITH SEPARATE COMPONENT CASINGS

(75) Inventors: Koji Yamashita, Chiyoda-ku (JP);
Hiroyuki Morimoto, Chiyoda-ku (JP);
Yuji Motomura, Chiyoda-ku (JP);
Takeshi Hatomura, Chiyoda-ku (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 687 days.

(21) Appl. No.: 13/576,369

(22) PCT Filed: Feb. 17, 2010

(86) PCT No.: PCT/JP2010/000973
§ 371 (c)(1),
(2), (4) Date: Jul. 31, 2012

(87) PCT Pub. No.: WO2011/101889
PCT Pub. Date: Aug. 25, 2011

(65) Prior Publication Data
US 2012/0297803 A1  Nov. 29, 2012

(51) Int. Cl.
*F25B 25/00* (2006.01)
*F25B 13/00* (2006.01)
*F25B 49/02* (2006.01)

(52) U.S. Cl.
CPC .............. *F25B 13/00* (2013.01); *F25B 25/005* (2013.01); *F25B 49/027* (2013.01); *F25B 2313/004* (2013.01); *F25B 2313/006* (2013.01); *F25B 2313/0231* (2013.01);

(Continued)

(58) Field of Classification Search
CPC ........ F25B 13/00; F25B 25/00; F25B 25/005; F25B 2313/004; F25B 2313/006; F25B 2313/023; F25B 2313/0231; F25B 2313/0233
USPC .................. 62/79, 159, 160, 175, 185, 324.1, 62/324.6, 335
See application file for complete search history.

(56) References Cited

U.S. PATENT DOCUMENTS 6,170,270 B1 * 1/2001 Arshansky et al. ............... 62/81

FOREIGN PATENT DOCUMENTS

| JP | 5-280818 A | 10/1993 |
| JP | 2001-289465 A | 10/2001 |

(Continued)

OTHER PUBLICATIONS

Chinese Office Action dated Dec. 2, 2014 issued in corresponding Chinese Patent Appln. No. 201080064099.1, with English translation (4 pages).

(Continued)

*Primary Examiner* — Jonathan Bradford
(74) *Attorney, Agent, or Firm* — Buchanan Ingersoll & Rooney PC

(57) ABSTRACT

An air-conditioning apparatus including, a first housing (an outdoor unit) that accommodates a compressor and a heat source side heat exchanger; a second housing (a heat medium relay unit) that accommodates a heat exchanger related to heat medium, an expansion device, and a pump; a third housing (a heat medium regulating unit) that accommodates a first heat medium flow switching device, a second heat medium flow switching device, and a heat medium flow control device; and a fourth housing (indoor unit) that accommodates a use side heat exchanger have separately different casings.

8 Claims, 6 Drawing Sheets

(52) U.S. Cl.
CPC  *F25B 2313/0233* (2013.01); *F25B 2313/0272* (2013.01); *F25B 2313/02732* (2013.01); *F25B 2313/02741* (2013.01); *F25B 2600/025* (2013.01); *F25B 2600/13* (2013.01); *Y02B 30/745* (2013.01)

(56) References Cited

FOREIGN PATENT DOCUMENTS

| | | |
|---|---|---|
| JP | 2002-106995 A | 4/2002 |
| JP | 2003-343936 A | 12/2003 |
| JP | 2004-61061 A | 2/2004 |
| JP | 2005-140444 A | 6/2005 |
| JP | 2009-41832 A | 2/2009 |
| WO | WO 2009/133644 A1 | 11/2009 |

OTHER PUBLICATIONS

International Search Report (PCT/ISA/210) issued on Apr. 20, 2010, by the Japanese Patent Office as the International Searching Authority for International Application No. PCT/JP2010/000973.

Office Action (Notification of the First Office Action) issued Mar. 18, 2014, by the Chinese Patent Office in corresponding Chinese Patent Application No. 201080064099.1, and an English Translation of the Office Action. (6 pages).

Japanese Office Action (Notice of Reasons for Rejection) dated Jun. 4, 2013, issued by the Japanese Patent Office in corresponding Japanese Patent Application No. 2012-500374, and English language translation of Office Action. (3 pages).

\* cited by examiner

AIR-CONDITIONING APPARATUS WITH SEPARATE COMPONENT CASINGS

TECHNICAL FIELD

The present invention relates to an air-conditioning apparatus that is applied to, for example, a multi-air-conditioning apparatus for a building.

BACKGROUND ART

In an air-conditioning apparatus such as a multi-air-conditioning apparatus for a building, a refrigerant is circulated between an outdoor unit, which is a heat source unit disposed, for example, outside a building, and indoor units disposed in rooms in the building. The refrigerant transfers heat or removes heat to heat or cool air, thus heating or cooling an air conditioned space through the heated or cooled air. Hydrofluorocarbon (HFC) based refrigerants are often used as the refrigerant, for example. An air-conditioning apparatus using a natural refrigerant, such as carbon dioxide ($CO_2$), has also been proposed.

Furthermore, in an air-conditioning apparatus called a chiller, cooling energy or heating energy is generated in a heat source unit disposed outside a structure. Water, antifreeze, or the like is heated or cooled by a heat exchanger disposed in an outdoor unit and it is carried to an indoor unit, such as a fan coil unit or a panel heater, to perform heating or cooling (refer to Patent Literature 1, for example).

Moreover, there is an air-conditioning apparatus called a heat recovery chiller that connects a heat source unit to each indoor unit with four water pipings arranged therebetween, supplies cooled and heated water or the like simultaneously, and allows the cooling and heating in the indoor units to be selected freely (refer to Patent Literature 2, for example).

In addition, there is an air-conditioning apparatus that disposes a heat exchanger for a primary refrigerant and a secondary refrigerant near each indoor unit in which the secondary refrigerant is carried to the indoor unit (refer to Patent Literature 3, for example).

Furthermore, there is an air-conditioning apparatus that connects an outdoor unit to each branch unit including a heat exchanger with two pipings in which a secondary refrigerant is carried to an indoor unit (refer to Patent Literature 4, for example).

CITATION LIST

Patent Literature

Patent Literature 1: Japanese Unexamined Patent Application Publication No. 2005-140444 (p. 4, FIG. 1, for example)
Patent Literature 2: Japanese Unexamined Patent Application Publication No. 5-280818 (pp. 4 and 5, FIG. 1, for example)
Patent Literature 3: Japanese Unexamined Patent Application Publication No. 2001-289465 (pp. 5 to 8, FIG. 1, FIG. 2, for example)
Patent Literature 4: Japanese Unexamined Patent Application Publication No. 2003-343936 (p. 5, FIG. 1)

SUMMARY OF INVENTION

Technical Problem

In an air-conditioning apparatus of the related art, such as a multi-air-conditioning apparatus for a building, there is a possibility of refrigerant leakage to, for example, an indoor space since the refrigerant is circulated to an indoor unit. On the other hand, in the air-conditioning apparatus disclosed in Patent Literature 1 and Patent Literature 2, the refrigerant does not pass through the indoor unit. However, in the air-conditioning apparatus disclosed in Patent Literature 1 and Patent Literature 2, the heat medium needs to be heated or cooled in a heat source unit disposed outside a structure, and needs to be carried to the indoor unit side. Accordingly, a circulation path of the heat medium becomes long. In this case, carrying of heat for a predetermined heating or cooling work using the heat medium consumes more amount of energy, in the form of conveyance power and the like, than the amount of energy consumed by the refrigerant. Accordingly, as the circulation path becomes long, the conveyance power becomes markedly large. This indicates that energy saving can be achieved in an air-conditioning apparatus if the circulation of the heat medium can be controlled appropriately.

In the air-conditioning apparatus disclosed in Patent Literature 2, the four pipings connecting the outdoor side and the indoor space need to be arranged in order to allow cooling or heating to be selectable in each indoor unit. Disadvantageously, there is little ease of construction. In the air-conditioning apparatus disclosed in Patent Literature 3, secondary medium circulating means such as a pump needs to be provided to each indoor unit. Disadvantageously, the system is not only costly but also creates a large noise, and is not practical. In addition, since the heat exchanger is disposed near each indoor unit, the risk of refrigerant leakage to a place near the indoor space cannot be eliminated.

In the air-conditioning apparatus disclosed in Patent Literature 4, a primary refrigerant that has exchanged heat flows into the same passage as that of the primary refrigerant before heat exchange. Accordingly, when a plurality of indoor units are connected, it is difficult for each indoor unit to exhibit its maximum capacity. Such a configuration wastes energy. Furthermore, each branch unit is connected to an extension piping with a total of four pipings, two for cooling and two for heating. This configuration is consequently similar to that of a system in which the outdoor unit is connected to each branching unit with four pipings. Accordingly, there is little ease of construction in such a system.

The present invention has been made to overcome the above-described disadvantages and provides an air-conditioning apparatus capable of achieving energy saving. The invention further provides an air-conditioning apparatus capable of achieving improvement of safety by not allowing refrigerant to circulate in or near an indoor unit. The invention further provides an air-conditioning apparatus that reduces the number of pipings connecting an outdoor unit to a branch unit (heat medium relay unit) or the branch unit to an indoor unit, and improves ease of construction as well as improving energy efficiency. Additionally, the invention further provides an air-conditioning apparatus that is capable of facilitating installation work in a building disposed with a chiller in which the water pipings are already installed.

Solution to Problem

An air-conditioning apparatus according to the invention includes a refrigerant circuit including a compressor, a heat source side heat exchanger, an expansion device, and a refrigerant side passage of a heat exchanger related to heat medium connected by piping in series, the refrigerant circuit circulating a heat source side refrigerant; and a heat medium circuit including a heat medium side passage of the heat exchanger related to heat medium, a pump, a first heat medium flow switching device, a use side heat exchanger, a heat medium flow control device, a second heat medium flow switching device connected by piping in series, the heat medium circuit circulating a heat medium, in which a first housing that accommodates the compressor and the outdoor heat exchanger, a second housing that accommodates the expansion device and the pump, a third housing that accommodates the first heat medium flow switching device and the second heat medium flow switching device, and a fourth housing that accommodates the use side heat exchanger have separately different casings, and the heat medium flow control device is accommodated in the third housing or the fourth housing.

Advantageous Effects of Invention

According to the air-conditioning apparatus of the invention, the pipings in which the heat medium circulates can be shortened and small conveyance power is required, and thus, safety is increased and energy is saved.

DESCRIPTION OF EMBODIMENT

Embodiment of the present invention will be described below with reference to the drawings.

Figure 1:
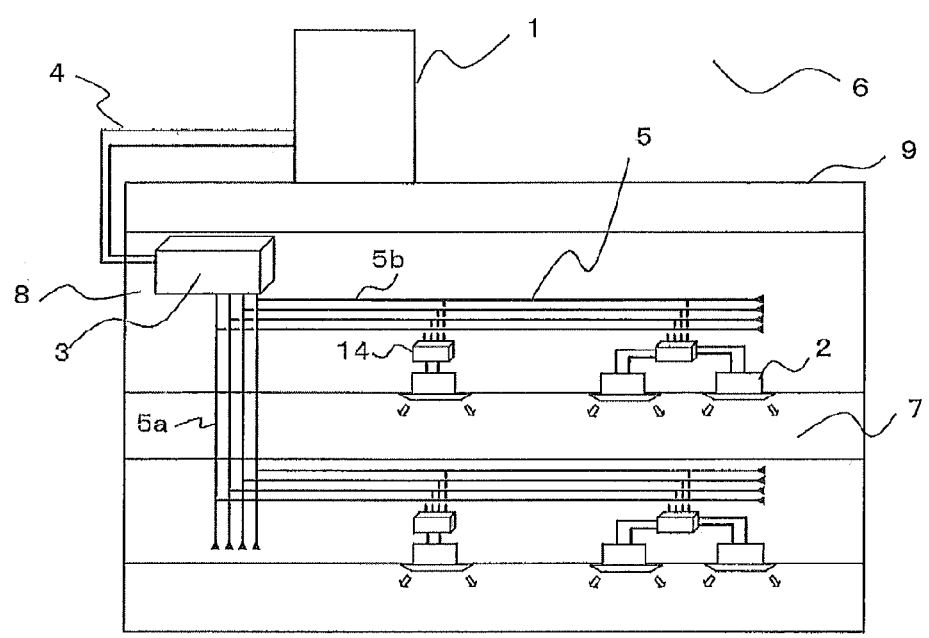
FIG. 1 is a schematic diagram illustrating an exemplary installation of an air-conditioning apparatus according to Embodiment of the invention.

FIG. 1 is a schematic diagram illustrating an exemplary installation of an air-conditioning apparatus according to Embodiment of the invention. The exemplary installation of the air-conditioning apparatus will be described with reference to FIG. 1. This air-conditioning apparatus uses refrigeration cycles (a refrigerant circuit A and a heat medium circuit B) in which refrigerants (a heat source side refrigerant or a heat medium) circulate such that a cooling mode or a heating mode can be freely selected as its operation mode in each indoor unit. It should be noted that the dimensional relationships of components in FIG. 1 and other subsequent figures may be different from the actual ones.

Referring to FIG. 1, the air-conditioning apparatus according to Embodiment includes a single outdoor unit 1, functioning as a heat source unit, a plurality of indoor units 2, a heat medium relay unit 3 disposed between the outdoor unit 1 and the indoor units 2, and heat medium regulating units 14 each disposed between the heat medium relay unit 3 and the corresponding one of the indoor units 2. The heat medium relay unit 3 exchanges heat between the heat source side refrigerant and the heat medium and each heat medium regulating unit 14 controls the passage and the flow rate of the heat medium flowing into the indoor unit 2. The outdoor unit 1 and the heat medium relay unit 3 are connected with refrigerant pipings 4 through which the heat source side refrigerant flows. The heat medium relay unit 3 and each heat medium regulating unit 14, as well as each heat medium regulating unit 14 and the corresponding indoor unit 2 are connected with pipings 5 (heat medium pipings) through which the heat medium flow. Cooling energy or heating energy generated in the outdoor unit 1 is delivered through the heat medium relay unit 3 and the heat medium regulating units 14 to the indoor units 2.

The outdoor unit 1 is typically disposed in an outdoor space 6 that is a space (e.g., a roof) outside a structure 9, such as a building, and is configured to supply cooling energy or heating energy through the heat medium relay unit 3 and the heat medium regulating units 14 to the indoor units 2. Each indoor unit 2 is disposed at a position that can supply cooling air or heating air to an indoor space 7, which is a space (e.g., a living room) inside the structure 9, and supplies air for cooling or air for heating to the indoor space 7 that is an air conditioned space.

The heat medium relay unit 3 is configured with a housing separate from the outdoor unit 1 and the indoor units 2 such that the heat medium relay unit 3 can be disposed at a position different from those of the outdoor space 6 and the indoor space 7 (for example, in a non-air conditioned space such as a common space, for example, a space above a ceiling of the structure 9 or an elevator hall) and is connected to the outdoor unit 1 by the refrigerant pipings 4 and is connected to the indoor units 2 through the heat medium regulating units 14 by the pipings 5 to convey cooling energy or heating energy supplied from the outdoor unit 1 to the indoor units 2. Each heat medium regulating unit 14 is disposed near the corresponding indoor unit 2 and controls the passage and the flow rate of the heat medium that is supplied from the heat medium relay unit 3 and that flows into the indoor unit 2. Note that "near the indoor unit 2", where the heat medium regulating unit 14 is disposed, may be any position that is closer to the indoor unit 2 than the heat medium relay unit 3 and may be a position that is in close vicinity to the indoor unit 2. The heat medium regulating unit 14 may be disposed in the same floor to that of the indoor unit 2 in a position having a little distance or may be disposed in a different floor to that of the indoor unit 2 as long as it is positioned between the heat medium relay unit 3 and the indoor unit 2.

As illustrated in FIG. 1, in the air-conditioning apparatus according to Embodiment, the outdoor unit 1 is connected to the heat medium relay unit 3 using two refrigerant pipings 4, the heat medium relay unit 3 is connected to each of the heat medium regulating units 14 using four pipings 5, and each of the heat medium regulating units 14 is connected to the corresponding indoor unit 2 using two pipings 5. The heat medium relay unit 3 and each of the heat medium regulating units 14 are connected by four main pipings (vertical pipings) 5a that are disposed in a substantially vertical direction in a pipe shaft or the like in the structure 9, for example, and four branch pipings (horizontal pipings) 5b that are disposed in a substantially horizontal direction in a space above a ceiling or the like of the structure 9, for example.

Incidentally, the conventional four-pipe type chiller air-conditioning apparatus also uses a similar piping configuration. Thus, the air-conditioning apparatus according to Embodiment can be applied to a building that has already been installed with chiller pipings (piping configuration for a chiller air-conditioning apparatus). That is, the outdoor unit 1, the heat medium relay unit 3, the heat medium regulating units 14, and the indoor units 2 can be installed and connected using existing chiller pipings as they are (the pipings 5 (main pipings 5a and branch pipings 5b) shown in FIG. 1), thus installation work is facilitated. Furthermore, since the pipings circulating the heat medium can be shortened compared to that of the chiller, conveyance power can be smaller. Hence, further energy saving can be achieved.

In the air-conditioning apparatus according to the invention, since the heat medium relay unit 3 can be disposed in an arbitrary place, the heat medium relay unit 3 can be disposed in a place away from the outdoor unit 1 so as to be more energy saving than the chiller. Further, since the outdoor unit 1 and the heat medium relay unit 3 are connected using two pipings (refrigerant pipings 4), the system is one with facilitated installation work of the outdoor (outdoor space 6) pipings compared to that of the chiller. Furthermore, since the heat medium regulating unit 14 and each indoor unit 2 are connected using two pipings (pipings 5) and hot water or cold water is allowed to flow therethrough, a fan coil dedicated to cooling can also be used for heating.

Furthermore, FIG. 1 illustrates a state where the heat medium relay unit 3 is disposed in the structure 9 but in a space different from the indoor space 7, for example, a space above a ceiling (hereinafter, simply referred to as a "space 8"). The heat medium relay unit 3 can be disposed in other spaces, such as a common space where an elevator or the like is installed. In addition, although FIG. 1 illustrates a case in which the indoor units 2 are of a ceiling-mounted cassette type, the indoor units are not limited to this type and, for example, a ceiling-concealed type, a ceiling-suspended type, or any type of indoor unit may be used as long as the unit can blow out heating air or cooling air into the indoor space 7 directly or through a duct or the like.

FIG. 1 illustrates a case in which the outdoor unit 1 is disposed in the outdoor space 6. The arrangement is not limited to this case. For example, the outdoor unit 1 may be disposed in an enclosed space, for example, a machine room with a ventilation opening, may be disposed inside the structure 9 as long as waste heat can be exhausted through an exhaust duct to the outside of the structure 9, or may be disposed inside the structure 9 when the used outdoor unit 1 is of a water-cooled type. Even when the outdoor unit 1 is disposed in such a place, no problem in particular will occur.

Furthermore, the heat medium relay unit 3 can be disposed near the outdoor unit 1. It should be noted that when the distance from the heat medium relay unit 3 to the indoor unit 2 is excessively long, because power for conveying the heat medium is significantly large, the advantageous effect of energy saving is reduced. Additionally, the numbers of connected outdoor units 1, the indoor units 2, the heat medium relay units 3, and the heat medium regulating units 14 are not limited to those illustrated in FIGS. 1 and 2. The numbers thereof can be determined in accordance with the structure 9 where the air-conditioning apparatus according to Embodiment is installed. Note that the heat medium regulating unit 14 may be disposed one-to-one with the indoor unit 2, or a single heat medium regulating unit 14 may be connected to a plurality of neighboring indoor units 2.

Figure 2:
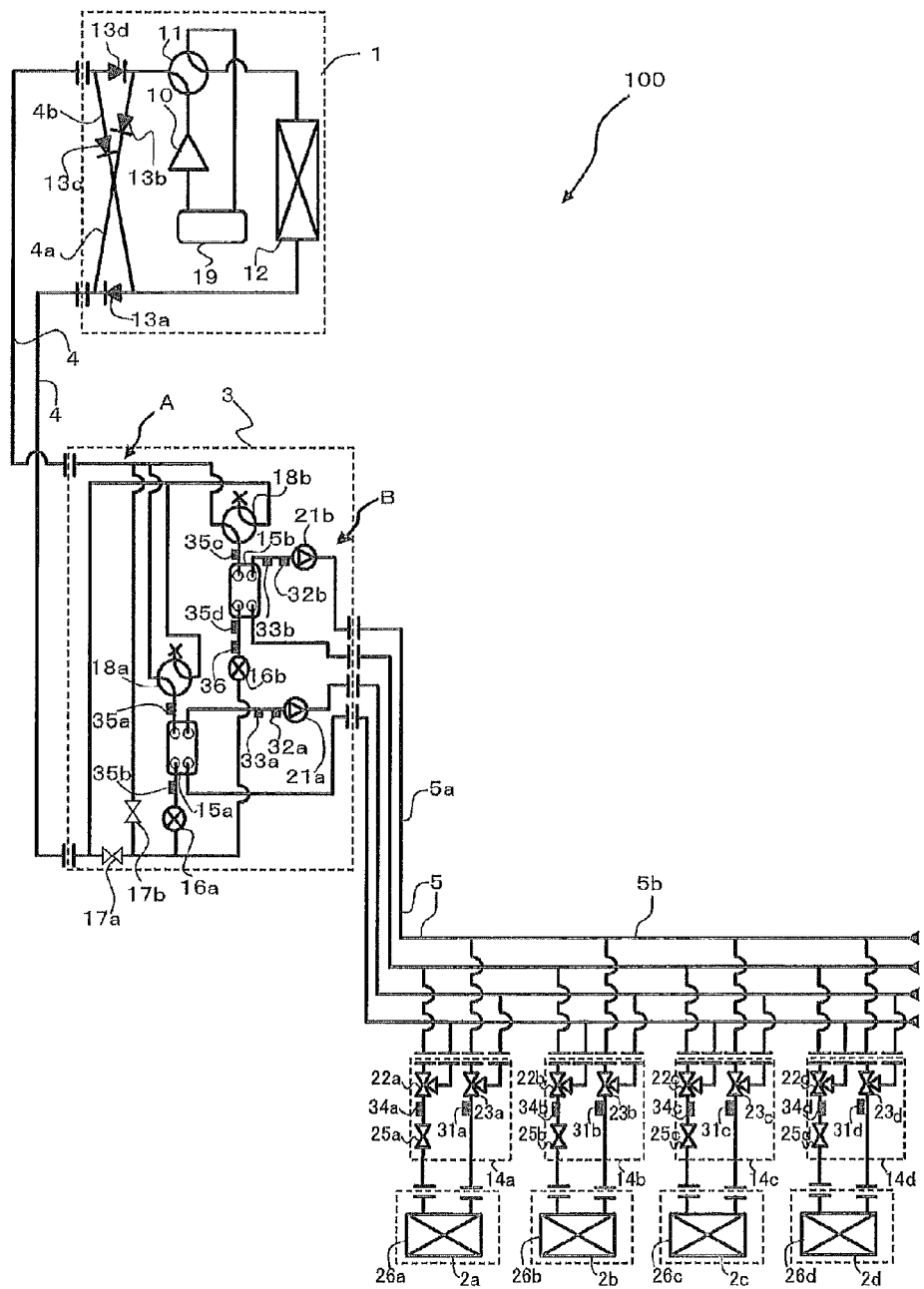
FIG. 2 is a schematic circuit diagram illustrating an exemplary circuit configuration of the air-conditioning apparatus according to Embodiment of the invention.

FIG. 2 is a schematic circuit diagram illustrating an exemplary circuit configuration of the air-conditioning apparatus (hereinafter, referred to as an "air-conditioning apparatus 100") according to Embodiment of the invention. The detailed configuration of the air-conditioning apparatus 100 will be described with reference to FIG. 2. As illustrated in FIG. 2, the outdoor unit 1 and the heat medium relay unit 3 are connected with the refrigerant pipings 4 through heat exchangers related to heat medium 15a and 15b included in the heat medium relay unit 3. Furthermore, the heat medium relay unit 3 and the heat medium regulating units 14 are connected with the pipings 5 through the heat exchangers related to heat medium 15a and 15b. The heat medium regulating unit 14 and the indoor unit 2 are connected with the pipings 5. Note that the refrigerant piping 4 will be described in detail later.

[Outdoor Unit 1]

The outdoor unit 1 includes a compressor 10, a first refrigerant flow switching device 11, such as a four-way valve, a heat source side heat exchanger 12, and an accumulator 19 that are mounted in a first housing and that are connected in series with the refrigerant pipings 4. The outdoor unit 1 further includes a first connecting piping 4a, a second connecting piping 4b, a check valve 13a, a check valve 13b, a check valve 13c, and a check valve 13d. By providing the first connecting piping 4a, the second connecting piping 4b, the check valve 13a, the check valve 13b, the check valve 13c, and the check valve 13d, the heat source side refrigerant can be made to flow into the heat medium relay unit 3 in a constant direction irrespective of the operation requested by the indoor units 2.

The compressor 10 sucks in the heat source side refrigerant and compresses the heat source side refrigerant to a high-temperature high-pressure state. The compressor 10 may include, for example, a capacity-controllable inverter compressor. The first refrigerant flow switching device 11 switches the flow of the heat source side refrigerant between a heating operation (a heating only operation mode and a heating main operation mode) and a cooling operation (a cooling only operation mode and a cooling main operation mode). The heat source side heat exchanger 12 functions as an evaporator in the heating operation, functions as a condenser (or a radiator) in the cooling operation, exchanges heat between air supplied from the air-moving device, such as a fan (not illustrated), and the heat source side refrigerant, and evaporates and gasifies or condenses and liquefies the heat source side refrigerant. The accumulator 19 is provided on the suction side of the compressor 10 and retains excess refrigerant.

The check valve 13d is provided in the refrigerant piping 4 between the heat medium relay unit 3 and the first refrigerant flow switching device 11 and permits the heat source side refrigerant to flow only in a predetermined direction (the direction from the heat medium relay unit 3 to the outdoor unit 1). The check valve 13a is provided in the refrigerant piping 4 between the heat source side heat exchanger 12 and the heat medium relay unit 3 and permits the heat source side refrigerant to flow only in a predetermined direction (the direction from the outdoor unit 1 to the heat medium relay unit 3). The check valve 13b is provided in the first connecting piping 4a and allows the heat source side refrigerant discharged from the compressor 10 to flow through the heat medium relay unit 3 during the heating operation. The check valve 13c is disposed in the second connecting piping 4b and allows the heat source side refrigerant, returning from the heat medium relay unit 3 to flow to the suction side of the compressor 10 during the heating operation.

The first connecting piping 4a connects the refrigerant piping 4, between the first refrigerant flow switching device 11 and the check valve 13d, to the refrigerant piping 4, between the check valve 13a and the heat medium relay unit 3, in the outdoor unit 1. The second connecting piping 4b is configured to connect the refrigerant piping 4, between the check valve 13d and the heat medium relay unit 3, to the refrigerant piping 4, between the heat source side heat exchanger 12 and the check valve 13a, in the outdoor unit 1. It should be noted that FIG. 2 illustrates a case in which the first connecting piping 4a, the second connecting piping 4b, the check valve 13a, the check valve 13b, the check valve 13c, and the check valve 13d are disposed, but the device is not limited to this case, and they do not necessarily have to be provided.

[Indoor Units 2]

Each of the indoor units 2 includes a use side heat exchanger 26 mounted in a fourth housing. The use side heat exchanger 26 is each connected to a heat medium flow control device 25 and a second heat medium flow switching device 23 in the heat medium regulating unit 14 with the pipings 5. Each of the use side heat exchangers 26 exchanges heat between air supplied from an air-moving device, such as a fan, (not illustrated) and the heat medium in order to generate air for heating or air for cooling supplied to the indoor space 7.

FIG. 2 illustrates a case in which four indoor units 2 are connected to the heat medium relay unit 3 through the heat medium regulating units 14. Illustrated are, from the left of the drawing, an indoor unit 2a, an indoor unit 2b, an indoor unit 2c, and an indoor unit 2d. In addition, the use side heat exchangers 26 are illustrated as, from the left of the drawing, a use side heat exchanger 26a, a use side heat exchanger 26b, a use side heat exchanger 26c, and a use side heat exchanger 26d each corresponding to the indoor units 2a to 2d. As is the case of FIG. 1, the number of connected indoor units 2 illustrated in FIG. 2 is not limited to four.

[Heat Medium Regulating Units 14]

Each of the heat medium regulating unit 14 includes a first heat medium flow switching device 22, a second heat medium flow switching device 23, and a heat medium flow control device 25 mounted in a third housing. The heat medium regulating units 14 are arranged so that the number thereof (four in this case) corresponds to the installed number of indoor units 2. Note that in each heat medium relay unit 14, the first heat medium flow switching device 22 and the second heat medium flow switching device 23 is disposed so that the heat medium inlet/outlet of the first heat medium flow switching device 22 and the heat medium inlet/outlet of the second heat medium flow switching device 23 are aligned.

Each of the first heat medium flow switching devices 22 (first heat medium flow switching devices 22a to 22d) includes, for example, a three-way valve and switches passages of the heat medium. Each first heat medium flow switching device 22 is disposed on an outlet side of a heat medium passage of the corresponding use side heat exchanger 26 such that one of the three ways is connected to the heat exchanger related to heat medium 15a in the heat medium relay unit 3 through the piping 5, another one of the three ways is connected to the heat exchanger related to heat medium 15b in the heat medium relay unit 3 through the piping 5, and the other one of the three ways is connected to the corresponding heat medium flow control device 25. Furthermore, illustrated from the left of the drawing are the first heat medium flow switching device 22a, the first heat medium flow switching device 22b, the first heat medium flow switching device 22c, and the first heat medium flow switching device 22d, so as to correspond to the respective indoor units 2.

Each of the second heat medium flow switching devices 23 (second heat medium flow switching devices 23a to 23d) includes, for example, a three-way valve and switches passages of the heat medium. Each second heat medium flow switching device 23 is disposed on an inlet side of a heat medium passage of the corresponding use side heat exchanger 26 such that one of the three ways is connected to the heat exchanger related to heat medium 15a in the heat medium relay unit 3 through the piping 5, another one of the three ways is connected to the heat exchanger related to heat medium 15b in the heat medium relay unit 3 through the piping 5, and the other one of the three ways is connected to the corresponding use side heat exchanger 26. Furthermore, illustrated from the left of the drawing are the second heat medium flow switching device 23a, the second heat medium flow switching device 23b, the second heat medium flow switching device 23c, and the second heat medium flow switching device 23d, so as to correspond to the respective indoor units 2.

Each of the heat medium flow control devices 25 (heat medium flow control devices 25a to 25d) includes, for example, a two-way valve capable of controlling the area of opening and controls the flow rate of the heat medium flowing in the piping 5. Each heat medium flow control device 25 is disposed on the outlet side of the heat medium passage of the corresponding use side heat exchanger 26 such that one way is connected to the use side heat exchanger 26 and the other way is connected to the first heat medium flow switching device 22. Furthermore, illustrated from the left of the drawing are the heat medium flow control device 25a, the heat medium flow control device 25b, the heat medium flow control device 25c, and the heat medium flow control device 25d so as to correspond to the respective indoor units 2. In addition, each of the heat medium flow control devices 25 may be disposed on the inlet side of the heat medium passage of the corresponding use side heat exchanger 26. Furthermore, each heat medium flow control device 25 does not have to be disposed inside or near the corresponding heat medium regulating unit 14 and may be configured to be accommodated inside or near the corresponding indoor unit 2 as long as it is disposed in a position of a passage between the use side heat exchanger 26 and the first heat medium flow switching device 22 or in a position of a passage between the use side heat exchanger 26 and the second heat medium flow switching device 23.

Further, the heat medium regulating units 14 are provided with first temperature sensors 31 (first temperature sensors 31a to 31d) and second temperature sensors 34 (second temperature sensors 34a to 34d). Information (temperature information) detected by the detection devices is sent to a controller (not shown) that performs integrated control of the operation of the air-conditioning apparatus 100 and are used to control the rotation speed of the air-moving device (not shown), the switching of the heat medium passage, and the like.

Each of the first temperature sensors 31 is disposed between the corresponding second heat medium flow switching device 23 and the use side heat exchanger 26 and detects the temperature of the heat medium flowing into the use side heat exchanger 26. A thermistor or the like may be used as the first temperature sensor 31. Furthermore, illustrated from the left of the drawing are the first temperature sensor 31a, the first temperature sensor 31b, the first temperature sensor 31c, and the first temperature sensor 31d so as to correspond to the respective indoor units 2.

Each of the second temperature sensors 34 is disposed between the corresponding first heat medium flow switching device 22 and the heat medium flow control device 25 and detects the temperature of the heat medium flowing out of each use side heat exchanger 26. A thermistor or the like may be used as the second temperature sensor 34. Furthermore, illustrated from the left of the drawing are the second temperature sensor 34a, the second temperature sensor 34b, the second temperature sensor 34c, and the second temperature sensor 34d so as to correspond to the respective indoor units 2.

As regards the pipings 5 in which the heat medium flows, the heat medium relay unit 3 is connected to four pipings 5 and each indoor unit 2 is connected to two pipings 5. The pipings 5 are connected with the first heat medium flow switching devices 22 and the second heat medium flow switching devices 23. Controlling the first heat medium flow switching devices 22 and the second heat medium flow switching devices 23 determines whether the heat medium flowing from the heat exchanger related to heat medium 15a is allowed to flow into the use side heat exchanger 26 or whether the heat medium flowing from the heat exchanger related to heat medium 15b is allowed to flow into the use side heat exchanger 26.

Note that, as shown in FIG. 1, the heat medium regulating unit 14 may be disposed one-to-one with the indoor unit 2, or a single heat medium regulating unit 14 may be connected to a plurality of neighboring indoor units 2. In the former case, it may be configured such that a single heat medium flow control device 25 and two heat medium flow switching devices are housed in a single heat medium regulating unit 14, and in the latter case, it may be configured such that n units of heat medium flow control devices 25 and the doubled number of n units of heat medium flow switching devices are housed in a single heat medium regulating unit 14.

[Heat Medium Relay Unit 3]

The heat medium relay unit 3 includes two heat exchangers related to heat medium 15, two expansion devices 16, two on-off devices 17, two second refrigerant flow switching devices 18, and two pumps 21 mounted in a second housing.

Each of the two heat exchangers related to heat medium 15 (the heat exchanger related to heat medium 15a and the heat exchanger related to heat medium 15b) functions as a condenser (radiator) or an evaporator and exchanges heat between the heat source side refrigerant and the heat medium in order to transfer cooling energy or heating energy, generated in the outdoor unit 1 and stored in the heat source side refrigerant, to the heat medium. The heat exchanger related to heat medium 15a is disposed between an expansion device 16a and a second refrigerant flow switching device 18a in a refrigerant circuit A and is used to cool the heat medium in the cooling and heating mixed operation mode, that is, functions as a heat exchanger for cooling. Further, the heat exchanger related to heat medium 15b is disposed between an expansion device 16b and a second refrigerant flow switching device 18b in a refrigerant circuit A and is used to heat the heat medium in the cooling and heating mixed operation mode, that is, functions as a heat exchanger for heating.

The two expansion devices 16 (expansion devices 16a and 16b) each have functions of a reducing valve and an expansion valve and are configured to reduce the pressure of and expand the heat source side refrigerant. The expansion device 16a is disposed upstream of the heat exchanger related to heat medium 15a, upstream regarding the heat source side refrigerant flow during the cooling operation. The expansion device 16b is disposed upstream of the heat exchanger related to heat medium 15b, upstream regarding the heat source side refrigerant flow during the cooling operation. Each of the two expansion devices 16 may include a component having a variably controllable opening degree, such as an electronic expansion valve.

The two on-off devices 17 (on-off devices 17a and 17b) each include, for example, a two-way valve and open and close the refrigerant piping 4. The on-off device 17a is disposed in the refrigerant piping 4 on the inlet side of the heat source side refrigerant. The on-off device 17b is disposed in a piping connecting the refrigerant piping 4 on the inlet side of the heat source side refrigerant and the refrigerant piping 4 on an outlet side thereof.

The two second refrigerant flow switching devices 18 (second refrigerant flow switching devices 18a and 18b) each include, for example, a four-way valve and switch passages of the heat source side refrigerant in accordance with the operation mode. The second refrigerant flow switching device 18a is disposed downstream of the heat exchanger related to heat medium 15a, downstream regarding the heat source side refrigerant flow during the cooling operation. The second refrigerant flow switching device 18b is disposed downstream of the heat exchanger related to heat medium 15b, downstream regarding the heat source side refrigerant flow during the cooling only operation.

The two pumps 21 (pump 21a and 21b) circulate the heat medium flowing through the piping 5. The pump 21a is disposed in the piping 5 between the heat exchanger related to heat medium 15a and the second heat medium flow switching devices 23. The pump 21b is disposed in the piping 5 between the heat exchanger related to heat medium 15b and the second heat medium flow switching devices 23. Each of the two pumps 21 may include, for example, a capacity-controllable pump.

The heat medium relay unit 3 includes two first temperature sensors 32, two third temperature sensors 33, four fourth temperature sensors 35, and a second pressure sensor 36. Information (temperature information and pressure information) detected by these detecting devices is transmitted to a controller (not illustrated) that performs integrated control of the operation of the air-conditioning apparatus 100 such that the information is used to control, for example, the driving frequency of the compressor 10, switching of the first refrigerant flow switching device 11, the driving frequency of the pumps 21, switching of the second refrigerant flow switching devices 18.

Each of the two third temperature sensors 33 (a third temperature sensors 33a and 33b) detects the temperature of the heat medium flowing out of the corresponding heat exchanger related to heat medium 15, namely, the heat medium at an outlet of the corresponding heat exchanger related to heat medium 15 and may include, for example, a thermistor. The third temperature sensor 33a is disposed in the piping 5 on the inlet side of the pump 21a. The third temperature sensor 33b is disposed in the piping 5 on the inlet side of the pump 21b.

Each of the fourth temperature sensors 35 (fourth temperature sensors 35a to 35d) is disposed on the inlet side or the outlet side of a heat source side refrigerant of the heat exchanger related to heat medium 15 and detects the temperature of the heat source side refrigerant flowing into the heat exchanger related to heat medium 15 or the temperature of the heat source side refrigerant flowing out of the heat exchanger related to heat medium 15 and may include, for example, a thermistor. The fourth temperature sensor 35a is disposed between the heat exchanger related to heat medium 15a and the second refrigerant flow switching device 18a. The fourth temperature sensor 35b is disposed between the heat exchanger related to heat medium 15a and the expansion device 16a. The fourth temperature sensor 35c is disposed between the heat exchanger related to heat medium 15b and the second refrigerant flow switching device 18b. The fourth temperature sensor 35d is disposed between the heat exchanger related to heat medium 15b and the expansion device 16b.

Each of the two first pressure sensors 32 (first pressure sensors 32a and 32b) detects the pressure of the heat medium flowing out of the corresponding heat exchanger related to heat medium 15, namely, the heat medium at an outlet of the corresponding heat exchanger related to heat medium 15. The first pressure sensor 32a is disposed in the piping 5 on the inlet side of the pump 21a. The first pressure sensor 32b is disposed in the piping 5 on the inlet side of the pump 21b. Note that each of the first pressure sensors 32 may be disposed in the piping 5 on the outlet side of the corresponding one of the pumps 21.

The second pressure sensor 36 is disposed between the heat exchanger related to heat medium 15b and the expansion device 16b, similar to the installation position of the fourth temperature sensor 35d, and is configured to detect the pressure of the heat source side refrigerant flowing between the heat exchanger related to heat medium 15b and the expansion device 16b.

Further, the controller (not illustrated) includes, for example, a microcomputer and controls, for example, the driving frequency of the compressor 10, the rotation speed (including ON/OFF) of the air-moving device, switching of the first refrigerant flow switching device 11, driving of the pumps 21, the opening degree of each expansion device 16, on and off of each on-off device 17, switching of the second refrigerant flow switching devices 18, switching of the first heat medium flow switching devices 22, switching of the second heat medium flow switching devices 23, and the opening degree of each heat medium flow control device 25 on the basis of the information detected by the various detecting means and an instruction from a remote control to carry out the operation modes which will be described later. Note that the controller may be provided to each unit, or may be provided to the outdoor unit 1 or the heat medium relay unit 3.

The pipings 5 in which the heat medium flows include the pipings connected to the heat exchanger related to heat medium 15a and the pipings connected to the heat exchanger related to heat medium 15b. Further, the pipings 5 include the main pipings 5a and the branch pipings 5b. Four main pipings 5a are connected to the heat medium relay unit 3 and each of the main pipings 5a is connected to the corresponding one of the branch pipings 5b. That is, each piping 5 is branched (into four in this case) in accordance with the number of heat medium regulating units 14 connected to the branch pipings 5b.

In the air-conditioning apparatus 100, the compressor 10, the first refrigerant flow switching device 11, the heat source side heat exchanger 12, the on-off devices 17, the second refrigerant flow switching devices 18, a passage of the heat exchanger related to heat medium 15a on the refrigerant side, the expansion devices 16, and the accumulator 19 are connected through the refrigerant piping 4, thus forming the refrigerant circuit A. In addition, a passage of the heat exchanger related to heat medium 15a on the heat medium side, the pumps 21, the first heat medium flow switching devices 22, the heat medium flow control devices 25, the use side heat exchangers 26, and the second heat medium flow switching devices 23 are connected through the pipings 5, thus forming the heat medium circuit B. In other words, the plurality of use side heat exchangers 26 are connected in parallel to each of the heat exchangers related to heat medium 15, thus turning the heat medium circuit B into a multi-system.

Accordingly, in the air-conditioning apparatus 100, the outdoor unit 1 and the heat medium relay unit 3 are connected through the heat exchanger related to heat medium 15a and the heat exchanger related to heat medium 15b arranged in the heat medium relay unit 3. The heat medium relay unit 3 and each indoor unit 2 are connected through the heat exchanger related to heat medium 15a and the heat exchanger related to heat medium 15b via the corresponding heat medium regulating unit 14. In other words, in the air-conditioning apparatus 100, the heat exchanger related to heat medium 15a and the heat exchanger related to heat medium 15b each exchange heat between the heat source side refrigerant circulating in the refrigerant circuit A and the heat medium circulating in the heat medium circuit B.

Various operation modes executed by the air-conditioning apparatus 100 will be described below. The air-conditioning apparatus 100 allows each indoor unit 2, on the basis of an instruction from the indoor unit 2, to perform a cooling operation or heating operation. Specifically, the air-conditioning apparatus 100 may allow all of the indoor units 2 to perform the same operation and also allow each of the indoor units 2 to perform different operations.

The operation modes carried out by the air-conditioning apparatus 100 includes a cooling only operation mode in which all of the operating indoor units 2 perform the cooling operation, a heating only operation mode in which all of the operating indoor units 2 perform the heating operation, a cooling main operation mode that is a cooling and heating mixed operation mode in which cooling load is larger, and a heating main operation mode that is a cooling and heating mixed operation mode in which heating load is larger. The operation modes will be described below with respect to the flow of the heat source side refrigerant and that of the heat medium.

[Cooling Only Operation Mode]

Figure 3:
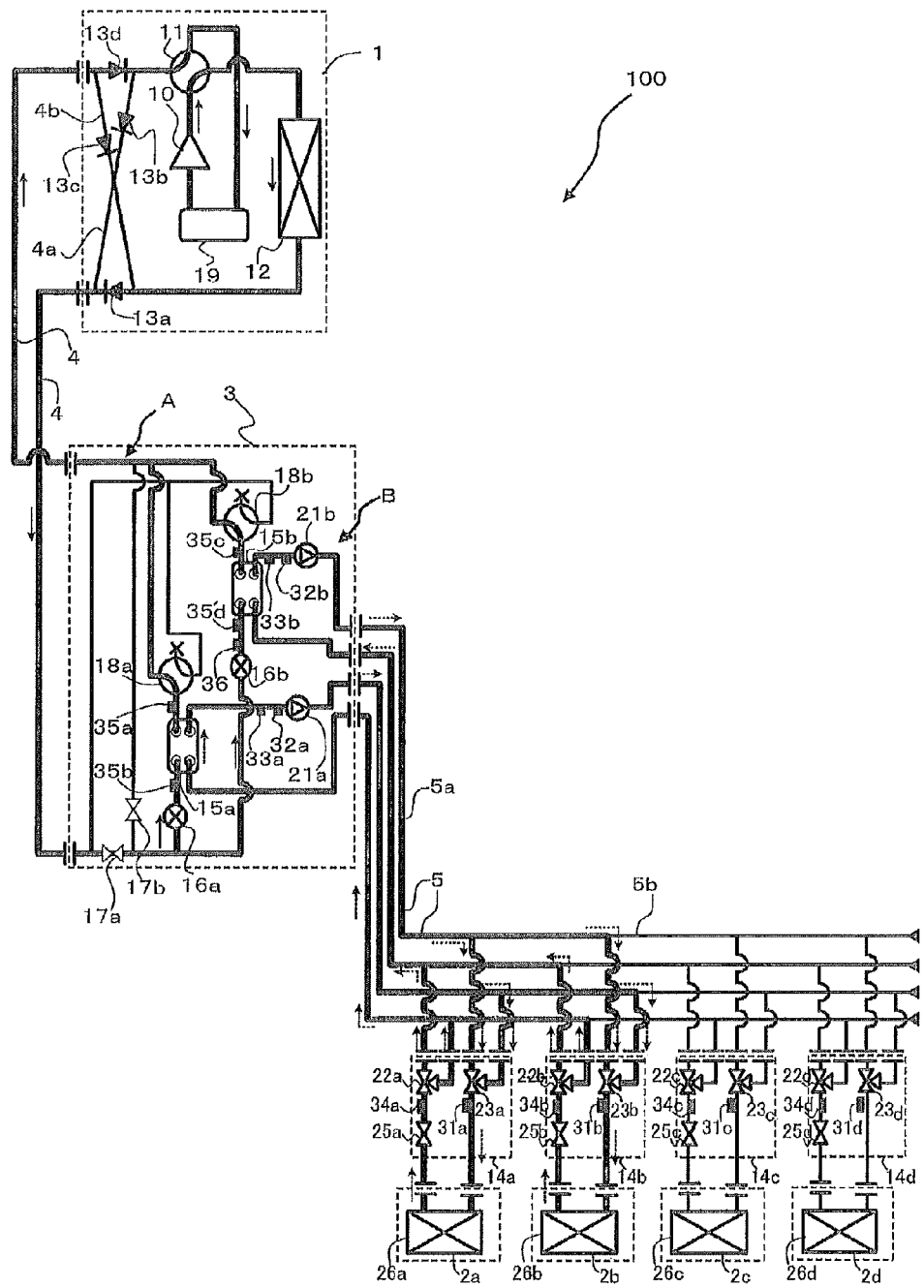
FIG. 3 is a refrigerant circuit diagram illustrating flows of refrigerants in a cooling only operation mode of the air-conditioning apparatus according to Embodiment of the invention.

FIG. 3 is a refrigerant circuit diagram illustrating the flows of the refrigerants in the cooling only operation mode of the air-conditioning apparatus 100. The cooling only operation mode will be described with respect to a case in which cooling loads are generated only in the use side heat exchanger 26a and the use side heat exchanger 26b in FIG. 3. Furthermore, in FIG. 3, pipings indicated by thick lines indicate pipings through which the refrigerants (the heat source side refrigerant and the heat medium) flow. In addition, the direction of flow of the heat source side refrigerant is indicated by solid-line arrows and the direction of flow of the heat medium is indicated by broken-line arrows in FIG. 3.

In the cooling only operation mode illustrated in FIG. 3, the first refrigerant flow switching device 11 is switched such that the heat source side refrigerant discharged from the compressor 10 flows into the heat source side heat exchanger 12 in the outdoor unit 1. In the heat medium relay unit 3, the pump 21a and the pump 21b are driven, and in the heat medium regulating units 14, the heat medium flow control device 25a and the heat medium flow control device 25b are opened and the heat medium flow control device 25c and the heat medium flow control device 25d are totally closed such that the heat medium circulates between each of the heat exchanger related to heat medium 15a and the heat exchanger related to heat medium 15b and each of the use side heat exchanger 26a and the use side heat exchanger 26b.

First, the flow of the heat source side refrigerant in the refrigerant circuit A will be described.

A low-temperature low-pressure refrigerant is compressed by the compressor 10 and is discharged as a high-temperature high-pressure gas refrigerant therefrom. The high-temperature high-pressure gas refrigerant discharged from the compressor 10 flows through the first refrigerant flow switching device 11 into the heat source side heat exchanger 12. Then, the refrigerant is condensed and liquefied into a high-pressure liquid refrigerant while transferring heat to outdoor air in the heat source side heat exchanger 12. The high-pressure liquid refrigerant flowing out of the heat source side heat exchanger 12 passes through the check valve 13a, flows out of the outdoor unit 1, passes through the refrigerant piping 4, and flows into the heat medium relay unit 3. The high-pressure liquid refrigerant that has flowed into the heat medium relay unit 3 is branched after passing through the on-off device 17a and is expanded into a low-temperature low-pressure two-phase refrigerant by the expansion device 16a and the expansion device 16b.

This two-phase refrigerant flows into each of the heat exchanger related to heat medium 15a and the heat exchanger related to heat medium 15b, functioning as evaporators, removes heat from the heat medium circulating in the heat medium circuit B, cools the heat medium, and turns into a low-temperature low-pressure gas refrigerant. The gas refrigerant, which has flowed out of each of the heat exchanger related to heat medium 15a and the heat exchanger related to heat medium 15b, flows out of the heat medium relay unit 3 through the corresponding one of the second refrigerant flow switching device 18a and the second refrigerant flow switching device 18b, passes through the refrigerant piping 4, and again flows into the outdoor unit 1. The refrigerant that has flowed into the outdoor unit 1 passes through the check valve 13d, the first refrigerant flow switching device 11, and the accumulator 19, and is again sucked into the compressor 10.

At this time, the opening degree of the expansion device 16a is controlled such that superheat (the degree of superheat) is constant, the superheat being obtained as the difference between a temperature detected by the fourth temperature sensor 35a and that detected by the fourth temperature sensor 35b. Similarly, the opening degree of the expansion device 16b is controlled such that superheat is constant, in which the superheat is obtained as the difference between a temperature detected by the fourth temperature sensor 35c and that detected by the fourth temperature sensor 35d. In addition, the on-off device 17a is opened and the on-off device 17b is closed.

Next, the flow of the heat medium in the heat medium circuit B will be described.

In the cooling only operation mode, both the heat exchanger related to heat medium 15a and the heat exchanger related to heat medium 15b transfer cooling energy of the heat source side refrigerant to the heat medium, and the pump 21a and the pump 21b allow the cooled heat medium to flow through the pipings 5. The heat medium, which has flowed out of each of the pump 21a and the pump 21b while being pressurized, flows through the second heat medium flow switching device 23a and the second heat medium flow switching device 23b into the use side heat exchanger 26a and the use side heat exchanger 26b. The heat medium removes heat from the indoor air in each of the use side heat exchanger 26a and the use side heat exchanger 26b, thus cools the indoor space 7.

Then, the heat medium flows out of the use side heat exchanger 26a and the use side heat exchanger 26b and flows into the heat medium flow control device 25a and the heat medium flow control device 25b, respectively. At this time, the function of each of the heat medium flow control device 25a and the heat medium flow control device 25b allows the heat medium to flow into the corresponding one of the use side heat exchanger 26a and the use side heat exchanger 26b while controlling the heat medium to a flow rate sufficient to cover an air conditioning load required in the indoor space. The heat medium, which has flowed out of the heat medium flow control device 25a and the heat medium flow control device 25b, passes through the first heat medium flow switching device 22a and the first heat medium flow switching device 22b, respectively, flows into the heat exchanger related to heat medium 15a and the heat exchanger related to heat medium 15b, and is again sucked into the pump 21a and the pump 21b.

Note that in the pipings 5 of each use side heat exchanger 26, the heat medium is directed to flow from the second heat medium flow switching device 23 through the heat medium flow control device 25 to the first heat medium flow switching device 22. The air conditioning load required in the indoor space 7 can be covered by controlling the difference between a temperature detected by the first temperature sensor 31 and a temperature detected by the second temperature sensor 34 so that the difference is maintained at a target value. At this time, the opening degree of each of the first heat medium flow switching devices 22 and the second heat medium flow switching devices 23 are set to a medium degree such that passages to both of the heat exchanger related to heat medium 15a and the heat exchanger related to heat medium 15b are established.

Upon carrying out the cooling only operation mode, since it is unnecessary to supply the heat medium to each use side heat exchanger 26 having no heat load (including thermo-off), the passage is closed by the corresponding heat medium flow control device 25 such that the heat medium does not flow into the corresponding use side heat exchanger 26. In FIG. 3, the heat medium is supplied to the use side heat exchanger 26a and the use side heat exchanger 26b because these use side heat exchangers have heat loads. The use side heat exchanger 26c and the use side heat exchanger 26d have no heat load and the corresponding heat medium flow control devices 25c and 25d are totally closed. When a heat load is generated in the use side heat exchanger 26c or the use side heat exchanger 26d, the heat medium flow control device 25c or the heat medium flow control device 25d may be opened such that the heat medium is circulated.

[Heating Only Operation Mode]

Figure 4:
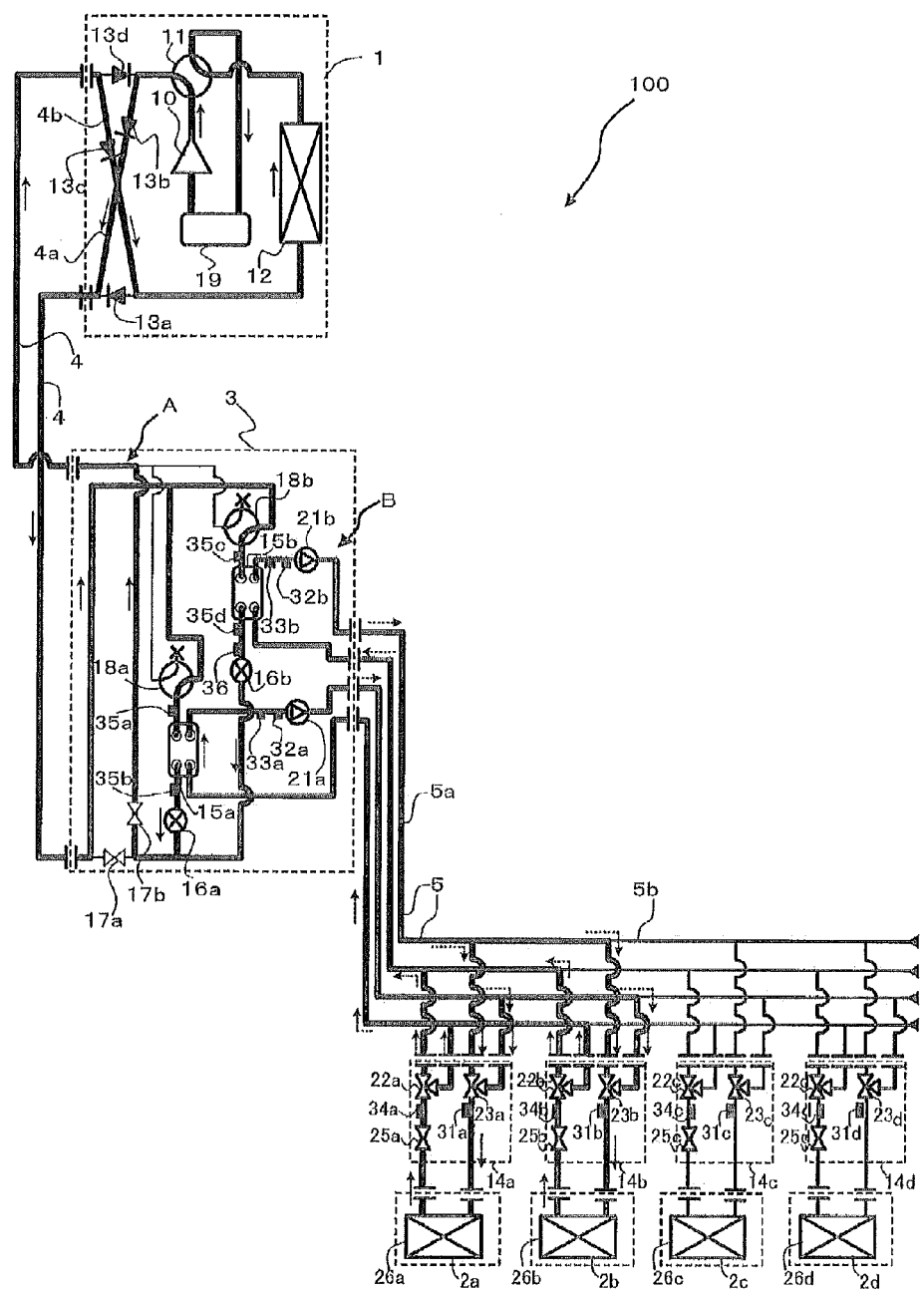
FIG. 4 is a refrigerant circuit diagram illustrating flows of refrigerants in a heating only operation mode of the air-conditioning apparatus according to Embodiment of the invention.

FIG. 4 is a refrigerant circuit diagram illustrating the flows of the refrigerants in the heating only operation mode of the air-conditioning apparatus 100. The heating only operation mode will be described with respect to a case in which heating loads are generated only in the use side heat exchanger 26a and the use side heat exchanger 26b in FIG. 4. Furthermore, in FIG. 4, pipings indicated by thick lines indicate pipings through which the refrigerants (the heat source side refrigerant and the heat medium) flow. In addition, the direction of flow of the heat source side refrigerant is indicated by solid-line arrows and the direction of flow of the heat medium is indicated by broken-line arrows in FIG. 4.

In the heating only operation mode illustrated in FIG. 4, the first refrigerant flow switching device 11 is switched such that the heat source side refrigerant discharged from the compressor 10 flows into the heat medium relay unit 3 without passing through the heat source side heat exchanger 12 in the outdoor unit 1. In the heat medium relay unit 3, the pump 21a and the pump 21b are driven, and in the heat medium regulating units 14, the heat medium flow control device 25a and the heat medium flow control device 25b are opened and the heat medium flow control device 25c and the heat medium flow control device 25d are totally closed such that the heat medium circulates between each of the heat exchanger related to heat medium 15a and the heat exchanger related to heat medium 15b and each of the use side heat exchanger 26a and the use side heat exchanger 26b.

First, the flow of the heat source side refrigerant in the refrigerant circuit A will be described.

A low-temperature low-pressure refrigerant is compressed by the compressor 10 and is discharged as a high-temperature high-pressure gas refrigerant therefrom. The high-temperature high-pressure gas refrigerant that has been discharged from the compressor 10 passes through the first refrigerant flow switching device 11, flows through the first connecting piping 4a, passes through the check valve 13b, and flows out of the outdoor unit 1. The high-temperature high-pressure gas refrigerant that has flowed out of the outdoor unit 1 passes through the refrigerant piping 4 and flows into the heat medium relay unit 3. The high-temperature high-pressure gas refrigerant that has flowed into the heat medium relay unit 3 is branched, passes through each of the second refrigerant flow switching device 18a and the second refrigerant flow switching device 18b, and flows into the corresponding one of the heat exchanger related to heat medium 15a and the heat exchanger related to heat medium 15b.

The high-temperature high-pressure gas refrigerant that has flowed into each of the heat exchanger related to heat medium 15a and the heat exchanger related to heat medium 15b is condensed and liquefied into a high-pressure liquid refrigerant while transferring heat to the heat medium circulating in the heat medium circuit B. The liquid refrigerant flowing out of the heat exchanger related to heat medium 15a and that flowing out of the heat exchanger related to heat medium 15b are expanded into a low-temperature low-pressure, two-phase refrigerant in the expansion device 16a and the expansion device 16b. This two-phase refrigerant passes through the on-off device 17b, flows out of the heat medium relay unit 3, passes through the refrigerant piping 4, and again flows into the outdoor unit 1. The refrigerant that has flowed into the outdoor unit 1 flows through the second connecting piping 4b, passes through the check valve 13c, and flows into the heat source side heat exchanger 12 functioning as an evaporator.

Then, the refrigerant that has flowed into the heat source side heat exchanger 12 removes heat from the outdoor air in the heat source side heat exchanger 12 and thus turns into a low-temperature low-pressure gas refrigerant. The low-temperature low-pressure gas refrigerant flowing out of the heat source side heat exchanger 12 passes through the first refrigerant flow switching device 11 and the accumulator 19 and is sucked into the compressor 10 again.

At that time, the opening degree of the expansion device 16a is controlled such that subcooling (degree of subcooling) obtained as the difference between a saturation temperature converted from a pressure detected by the second pressure sensor 36 and a temperature detected by the fourth temperature sensor 35b is constant. Similarly, the opening degree of the expansion device 16b is controlled such that subcooling is constant, in which the subcooling is obtained as the difference between the value indicating the saturation temperature converted from the pressure detected by the second pressure sensor 36 and a temperature detected by the fourth temperature sensor 35d. In addition, the on-off device 17a is closed and the on-off device 17b is opened. Note that when a temperature at the middle position of the heat exchangers related to heat medium 15 can be measured, the temperature at the middle position may be used instead of the second pressure sensor 36. Accordingly, the system can be constructed inexpensively.

Next, the flow of the heat medium in the heat medium circuit B will be described.

In the heating only operation mode, both of the heat exchanger related to heat medium 15a and the heat exchanger related to heat medium 15b transfer heating energy of the heat source side refrigerant to the heat medium, and the pump 21a and the pump 21b allow the heated heat medium to flow through the pipings 5. The heat medium, which has flowed out of each of the pump 21a and the pump 21b while being pressurized, flows through the second heat medium flow switching device 23a and the second heat medium flow switching device 23b into the use side heat exchanger 26a and the use side heat exchanger 26b. Then the heat medium transfers heat to the indoor air in the use side heat exchanger 26a and the use side heat exchanger 26b, thus heats the indoor space 7.

Then, the heat medium flows out of the use side heat exchanger 26a and the use side heat exchanger 26b and flows into the heat medium flow control device 25a and the heat medium flow control device 25b, respectively. At this time, the function of each of the heat medium flow control device 25a and the heat medium flow control device 25b allows the heat medium to flow into the corresponding one of the use side heat exchanger 26a and the use side heat exchanger 26b while controlling the heat medium to a flow rate sufficient to cover an air conditioning load required in the indoor space. The heat medium, which has flowed out of the heat medium flow control device 25a and the heat medium flow control device 25b, passes through the first heat medium flow switching device 22a and the first heat medium flow switching device 22b, respectively, flows into the heat exchanger related to heat medium 15a and the heat exchanger related to heat medium 15b, and is again sucked into the pump 21a and the pump 21b.

Note that in the pipings 5 of each use side heat exchanger 26, the heat medium is directed to flow from the second heat medium flow switching device 23 through the heat medium flow control device 25 to the first heat medium flow switching device 22. The air conditioning load required in the indoor space 7 can be covered by controlling the difference between a temperature detected by the first temperature sensor 31 and a temperature detected by the second temperature sensor 34 so that the difference is maintained at a target value. At this time, the opening degree of each of the first heat medium flow switching devices 22 and the second heat medium flow switching devices 23 are set to a medium degree such that passages to both of the heat exchanger related to heat medium 15a and the heat exchanger related to heat medium 15b are established.

Upon carrying out the heating only operation mode, since it is unnecessary to supply the heat medium to each use side heat exchanger 26 having no heat load (including thermo-off), the passage is closed by the corresponding heat medium flow control device 25 such that the heat medium does not flow into the corresponding use side heat exchanger 26. In FIG. 4, the heat medium is supplied to the use side heat exchanger 26a and the use side heat exchanger 26b because these use side heat exchangers have heat loads. The use side heat exchanger 26c and the use side heat exchanger 26d have no heat load and the corresponding heat medium flow control devices 25c and 25d are totally closed. When a heat load is generated in the use side heat exchanger 26c or the use side heat exchanger 26d, the heat medium flow control device 25c or the heat medium flow control device 25d may be opened such that the heat medium is circulated.

[Cooling Main Operation Mode]

Figure 5:
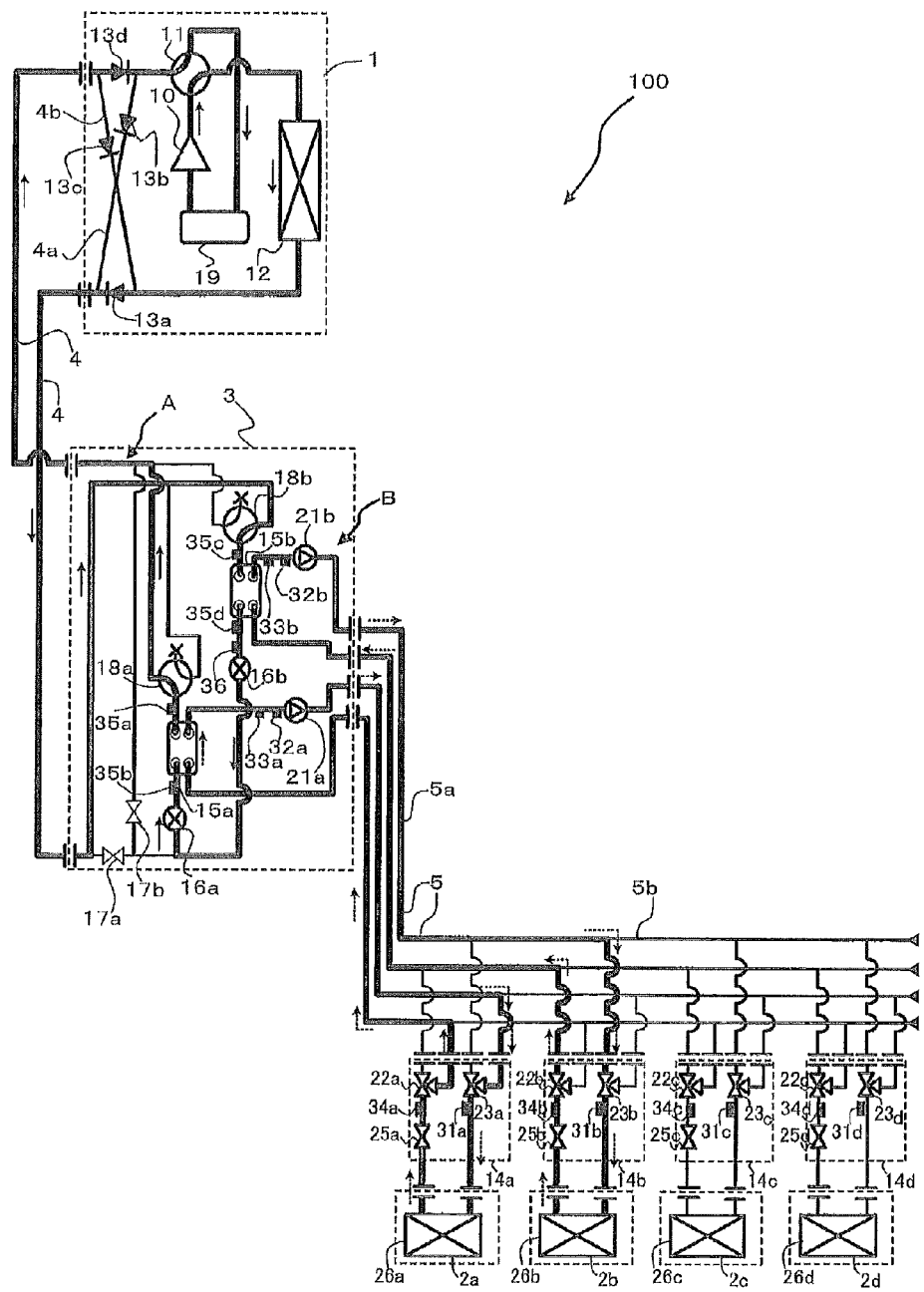
FIG. 5 is a refrigerant circuit diagram illustrating flows of refrigerants in a cooling main operation mode of the air-conditioning apparatus according to Embodiment of the invention.

FIG. 5 is a refrigerant circuit diagram illustrating the flows of the refrigerants in the cooling main operation mode of the air-conditioning apparatus 100. The cooling main operation mode will be described with respect to a case in which a cooling load is generated in the use side heat exchanger 26a and a heating load is generated in the use side heat exchanger 26b in FIG. 5. Furthermore, in FIG. 5, pipings indicated by thick lines correspond to pipings through which the refrigerants (the heat source side refrigerant and the heat medium) circulate. In addition, the direction of flow of the heat source side refrigerant is indicated by solid-line arrows and the direction of flow of the heat medium is indicated by broken-line arrows in FIG. 5.

In the cooling main operation mode illustrated in FIG. 5, the first refrigerant flow switching device 11 is switched such that the heat source side refrigerant discharged from the compressor 10 flows into the heat source side heat exchanger 12 in the outdoor unit 1. In the heat medium relay unit 3, the pump 21a and the pump 21b are driven, and in the heat medium regulating units 14 the heat medium flow control device 25a and the heat medium flow control device 25b are opened and the heat medium flow control device 25c and the heat medium flow control device 25d are totally closed such that the heat medium circulates between the heat exchanger related to heat medium 15a and the use side heat exchanger 26a, and between the heat exchanger related to heat medium 15b and the use side heat exchanger 26b.

First, the flow of the heat source side refrigerant in the refrigerant circuit A will be described.

A low-temperature low-pressure refrigerant is compressed by the compressor 10 and is discharged as a high-temperature high-pressure gas refrigerant therefrom. The high-temperature high-pressure gas refrigerant discharged from the compressor 10 flows through the first refrigerant flow switching device 11 into the heat source side heat exchanger 12. The refrigerant is condensed into a two-phase refrigerant in the heat source side heat exchanger 12 while transferring heat to the outside air. The two-phase refrigerant flowing out of the heat source side heat exchanger 12 passes through the check valve 13a, flows out of the outdoor unit 1, passes through the refrigerant piping 4, and flows into the heat medium relay unit 3. The two-phase refrigerant flowing into the heat medium relay unit 3 passes through the second refrigerant flow switching device 18b and flows into the heat exchanger related to heat medium 15b, functioning as a condenser.

The two-phase refrigerant that has flowed into the heat exchanger related to heat medium 15b is condensed and liquefied while transferring heat to the heat medium circulating in the heat medium circuit B, and turns into a liquid refrigerant. The liquid refrigerant flowing out of the heat exchanger related to heat medium 15b is expanded into a low-pressure two-phase refrigerant by the expansion device 16b. This low-pressure two-phase refrigerant flows through the expansion device 16a and into the heat exchanger related to heat medium 15a functioning as an evaporator. The low-pressure two-phase refrigerant that has flowed into the heat exchanger related to heat medium 15a removes heat from the heat medium circulating in the heat medium circuit B, cools the heat medium, and turns into a low-pressure gas refrigerant. The gas refrigerant flows out of the heat exchanger related to heat medium 15a, passes through the second refrigerant flow switching device 18a, flows out of the heat medium relay unit 3, and flows into the outdoor unit 1 again through the refrigerant piping 4. The refrigerant that has flowed into the outdoor unit 1 passes through the check valve 13d, the first refrigerant flow switching device 11, and the accumulator 19, and is again sucked into the compressor 10.

At this time, the opening degree of the expansion device 16b is controlled such that superheat is constant, the superheat being obtained as the difference between a temperature detected by the fourth temperature sensor 35a and that detected by the fourth temperature sensor 35b. In addition, the expansion device 16a is fully opened, the on-off device 17a is closed, and the on-off device 17b is closed. Note that the opening degree of the expansion device 16b may be controlled such that subcooling is constant, in which the subcooling is obtained as the difference between a value indicating a saturation temperature converted from a pressure detected by the second pressure sensor 36 and a temperature detected by the fourth temperature sensor 35d. Alternatively, the expansion device 16b may be fully opened and the expansion device 16a may control the superheat or the subcooling.

Next, the flow of the heat medium in the heat medium circuit B will be described.

In the cooling main operation mode, the heat exchanger related to heat medium 15b transfers heating energy of the heat source side refrigerant to the heat medium, and the pump 21b allows the heated heat medium to flow through the pipings 5. Furthermore, in the cooling main operation mode, the heat exchanger related to heat medium 15a transfers cooling energy of the heat source side refrigerant to the heat medium, and the pump 21a allows the cooled heat medium to flow through the pipings 5. The heat medium that has flowed out of each of the pump 21a and the pump 21b while being pressurized flows through the corresponding second heat medium flow switching device 23a and second heat medium flow switching device 23b into the corresponding use side heat exchanger 26a and the use side heat exchanger 26b.

In the use side heat exchanger 26b, the heat medium transfers heat to the indoor air, thus heats the indoor space 7. In addition, in the use side heat exchanger 26a, the heat medium removes heat from the indoor air, thus cools the indoor space 7. At this time, the function of each of the heat medium flow control device 25a and the heat medium flow control device 25b allows the heat medium to flow into the corresponding one of the use side heat exchanger 26a and the use side heat exchanger 26b while controlling the heat medium to a flow rate sufficient to cover an air conditioning load required in the indoor space. The heat medium, which has passed through the use side heat exchanger 26b with a slight decrease of temperature, passes through the heat medium flow control device 25b and the first heat medium flow switching device 22b, flows into the heat exchanger related to heat medium 15b, and is sucked into the pump 21b again. The heat medium, which has passed through the use side heat exchanger 26a with a slight increase of temperature, passes through the heat medium flow control device 25a and the first heat medium flow switching device 22a, flows into the heat exchanger related to heat medium 15a, and is then sucked into the pump 21a again.

During this time, the function of the first heat medium flow switching devices 22 and the second heat medium flow switching devices 23 allow the heated heat medium and the cooled heat medium to be introduced into the respective use side heat exchangers 26 having a heating load and a cooling load, without being mixed. Note that in the pipings 5 of each of the use side heat exchanger 26 for heating and that for cooling, the heat medium is directed to flow from the second heat medium flow switching device 23 through the heat medium flow control device 25 to the first heat medium flow switching device 22. The air conditioning load required in the indoor space 7 can be covered by controlling the difference between a temperature detected by the first temperature sensor 31 and a temperature detected by the second temperature sensor 34 so that the difference is maintained at a target value.

Upon carrying out the cooling main operation mode, since it is unnecessary to supply the heat medium to each use side heat exchanger 26 having no heat load (including thermo-off), the passage is closed by the corresponding heat medium flow control device 25 such that the heat medium does not flow into the corresponding use side heat exchanger 26. In FIG. 5, the heat medium is supplied to the use side heat exchanger 26a and the use side heat exchanger 26b because these use side heat exchangers have heat loads. The use side heat exchanger 26c and the use side heat exchanger 26d have no heat load and the corresponding heat medium flow control devices 25c and 25d are totally closed. When a heat load is generated in the use side heat exchanger 26c or the use side heat exchanger 26d, the heat medium flow control device 25c or the heat medium flow control device 25d may be opened such that the heat medium is circulated.

[Heating Main Operation Mode]

Figure 6:
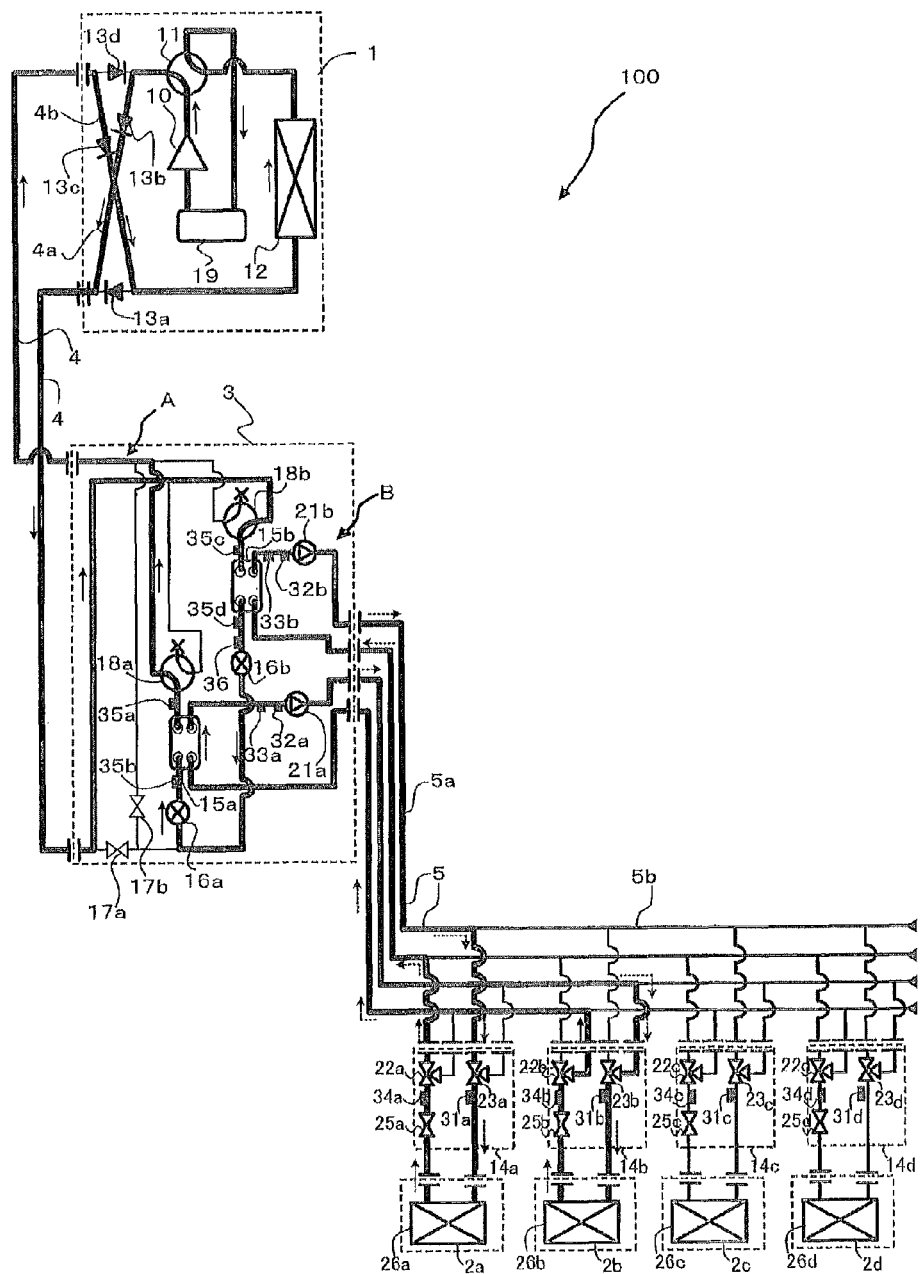
FIG. 6 is a refrigerant circuit diagram illustrating flows of refrigerants in a heating main operation mode of the air-conditioning apparatus according to Embodiment of the invention.

FIG. 6 is a refrigerant circuit diagram illustrating the flows of the refrigerants in the heating main operation mode of the air-conditioning apparatus 100. The heating main operation mode will be described with respect to a case in which a heating load is generated in the use side heat exchanger 26a and a cooling load is generated in the use side heat exchanger 26b in FIG. 6. Furthermore, in FIG. 6, pipings indicated by thick lines correspond to pipings through which the refrigerants (the heat source side refrigerant and the heat medium) circulate. In addition, the direction of flow of the heat source side refrigerant is indicated by solid-line arrows and the direction of flow of the heat medium is indicated by broken-line arrows in FIG. 6.

In the heating main operation mode illustrated in FIG. 6, in the outdoor unit 1, the first refrigerant flow switching device 11 is switched such that the heat source side refrigerant discharged from the compressor 10 flows into the heat medium relay unit 3 without passing through the heat source side heat exchanger 12. In the heat medium relay unit 3, the pump 21a and the pump 21b are driven, and in the heat medium regulating units 14, the heat medium flow control device 25a and the heat medium flow control device 25b are opened and the heat medium flow control device 25c and the heat medium flow control device 25d are totally closed such that the heat medium circulates between each of the heat exchanger related to heat medium 15a and the heat exchanger related to heat medium 15b and each of the use side heat exchanger 26a and the use side heat exchanger 26b.

First, the flow of the heat source side refrigerant in the refrigerant circuit A will be described.

A low-temperature low-pressure refrigerant is compressed by the compressor 10 and is discharged as a high-temperature high-pressure gas refrigerant therefrom. The high-temperature high-pressure gas refrigerant that has been discharged from the compressor 10 passes through the first refrigerant flow switching device 11, flows through the first connecting piping 4a, passes through the check valve 13b, and flows out of the outdoor unit 1. The high-temperature high-pressure gas refrigerant that has flowed out of the outdoor unit 1 passes through the refrigerant piping 4 and flows into the heat medium relay unit 3. The high-temperature high-pressure gas refrigerant that has flowed into the heat medium relay unit 3 passes through the second refrigerant flow switching device 18b and flows into the heat exchanger related to heat medium 15b functioning as a condenser.

The gas refrigerant that has flowed into the heat exchanger related to heat medium 15b is condensed and liquefied while transferring heat to the heat medium circulating in the heat medium circuit B, and turns into a liquid refrigerant. The liquid refrigerant flowing out of the heat exchanger related to heat medium 15b is expanded into a low-pressure two-phase refrigerant by the expansion device 16b. This low-pressure two-phase refrigerant flows through the expansion device 16a and into the heat exchanger related to heat medium 15a functioning as an evaporator. The low-pressure two-phase refrigerant that has flowed into the heat exchanger related to heat medium 15a removes heat from the heat medium circulating in the heat medium circuit B, is evaporated, and cools the heat medium. This low-pressure two-phase refrigerant flows out of the heat exchanger related to heat medium 15a, passes through the second refrigerant flow switching device 18a, flows out of the heat medium relay unit 3, passes through the refrigerant piping 4, and again flows into the outdoor unit 1.

The refrigerant that has flowed into the outdoor unit 1 passes through the check valve 13c and flows into the heat source side heat exchanger 12 functioning as an evaporator. Then, the refrigerant that has flowed into the heat source side heat exchanger 12 removes heat from the outdoor air in the heat source side heat exchanger 12 and thus turns into a low-temperature low-pressure gas refrigerant. The low-temperature low-pressure gas refrigerant flowing out of the heat source side heat exchanger 12 passes through the first refrigerant flow switching device 11 and the accumulator 19 and is sucked into the compressor 10 again.

At this time, the opening degree of the expansion device 16b is controlled such that subcooling is constant, the subcooling being obtained as the difference between a value indicating a saturation temperature converted from a pressure detected by the second pressure sensor 36 and a temperature detected by the fourth temperature sensor 35b. In addition, the expansion device 16a is fully opened, the on-off device 17a is closed, and the on-off device 17b is closed. Alternatively, the expansion device 16b may be fully opened and the expansion device 16a may control the subcooling.

Next, the flow of the heat medium in the heat medium circuit B will be described.

In the heating main operation mode, the heat exchanger related to heat medium 15b transfers heating energy of the heat source side refrigerant to the heat medium, and the pump 21b allows the heated heat medium to flow through the pipings 5. Furthermore, in the heating main operation mode, the heat exchanger related to heat medium 15a transfers cooling energy of the heat source side refrigerant to the heat medium, and the pump 21a allows the cooled heat medium to flow through the pipings 5. The heat medium, which has flowed out of each of the pump 21a and the pump 21b while being pressurized, flows through the second heat medium flow switching device 23a and the second heat medium flow switching device 23b into the use side heat exchanger 26a and the use side heat exchanger 26b.

In the use side heat exchanger 26b, the heat medium removes heat from the indoor air, thus cools the indoor space 7. In addition, in the use side heat exchanger 26a, the heat medium transfers heat to the indoor air, thus heats the indoor space 7. At this time, the function of each of the heat medium flow control device 25a and the heat medium flow control device 25b allows the heat medium to flow into the corresponding one of the use side heat exchanger 26a and the use side heat exchanger 26b while controlling the heat medium to a flow rate sufficient to cover an air conditioning load required in the indoor space. The heat medium, which has passed through the use side heat exchanger 26b with a slight increase of temperature, passes through the heat medium flow control device 25b and the first heat medium flow switching device 22b, flows into the heat exchanger related to heat medium 15a, and is sucked into the pump 21a again. The heat medium, which has passed through the use side heat exchanger 26a with a slight decrease of temperature, passes through the heat medium flow control device 25a and the first heat medium flow switching device 22a, flows into the heat exchanger related to heat medium 15b, and is again sucked into the pump 21b.

During this time, the function of the first heat medium flow switching devices 22 and the second heat medium flow switching devices 23 allow the heated heat medium and the cooled heat medium to be introduced into the respective use side heat exchangers 26 having a heating load and a cooling load, without being mixed. Note that in the pipings 5 of each of the use side heat exchanger 26 for heating and that for cooling, the heat medium is directed to flow from the second heat medium flow switching device 23 through the heat medium flow control device 25 to the first heat medium flow switching device 22. The air conditioning load required in the indoor space 7 can be covered by controlling the difference between a temperature detected by the first temperature sensor 31 and a temperature detected by the second temperature sensor 34 so that the difference is maintained at a target value.

Upon carrying out the heating main operation mode, since it is unnecessary to supply the heat medium to each use side heat exchanger 26 having no heat load (including thermo-off), the passage is closed by the corresponding heat medium flow control device 25 such that the heat medium does not flow into the corresponding use side heat exchanger 26. In FIG. 6, the heat medium is supplied to the use side heat exchanger 26a and the use side heat exchanger 26b because these use side heat exchangers have heat loads. The use side heat exchanger 26c and the use side heat exchanger 26d have no heat load and the corresponding heat medium flow control devices 25c and 25d are totally closed. When a heat load is generated in the use side heat exchanger 26c or the use side heat exchanger 26d, the heat medium flow control device 25c or the heat medium flow control device 25d may be opened such that the heat medium is circulated.

[Refrigerant Piping 4]

As described above, the air-conditioning apparatus 100 according to Embodiment 1 has several operation modes. In these operation modes, the heat source side refrigerant flows through the refrigerant pipings 4 connecting the outdoor unit 1 and the heat medium relay unit 3.

[Piping 5]

In some operation modes carried out by the air-conditioning apparatus 100 according to Embodiment, the heat medium, such as water or antifreeze, flows through the pipings 5 connecting the heat medium relay unit 3 and the heat medium regulating units 14, as well as the pipings 5 connecting the heat medium regulating units 14 and the indoor units 2.

[Cooperative Control]

The opening degree of each heat medium flow control device 25 is controlled so that the temperature difference between the detection temperature of the corresponding first temperature sensor 31 and the detection temperature of the corresponding second temperature sensor 34 approaches a target value. For example, when the use side heat exchanger 26a is performing a cooling operation, the opening degree of the heat medium flow control device 25a is controlled such that that the temperature difference between the detection temperature of the second temperature sensor 34a and the detection temperature of the first temperature sensor 31a approaches a target value of, for example, 5 degrees C. Further, when the use side heat exchanger 26a is performing a heating operation, the opening degree of the heat medium flow control device 25a is controlled such that that the temperature difference between the detection temperature of the first temperature sensor 31a and the detection temperature of the second temperature sensor 34a approaches a target value of, for example, 7 degrees C.

Note that the heat medium flow control device 25, the first temperature sensor 31, and the second temperature sensor 34 are accommodated in the heat medium regulating unit 14 and a controller (a third controller, not illustrated) that controls the opening degree of the heat medium flow control device 25 on the basis of information from the first temperature sensor 31 and the second temperature sensor 34 is disposed inside or near the heat medium regulating unit 14.

The rotation speed of each of the pumps 21 is controlled such that the corresponding one of the first pressure sensors 32 approaches a target value. For example, when performing the cooling only operation or the heating only operation, each rotation speed is controlled such that the mean pressure of the detection pressure of the first pressure sensor 32a and the detection pressure of the first pressure sensor 32b approaches a target value. Further, when performing the cooling and heating mixed operation, the rotation speed of the corresponding pump is controlled such that the detection pressure of the first pressure sensor 32a approaches a target value of the cooling side and the rotation speed of the corresponding pump is controlled such that the detection pressure of the first pressure sensor 32b approaches a target value of the heating side. The target value of the heating side and the target value of the cooling side may be the same value or may be a different value; the target value is set to a value of, for example, 200 kPa.

Note that the pump 21a, the pump 21b, the first pressure sensor 32a, and the first pressure sensor 32b are accommodated in the heat medium relay unit 3 and a controller (a first controller, not illustrated) that controls the rotation speed of each of the pumps 21 on the basis of information from the first pressure sensor 32a and the first pressure sensor 32b is disposed inside or near the heat medium relay unit 3.

The rotation speed of the compressor 10 and/or a fan (not shown) attached to the heat source side heat exchanger 12 is controlled such that the condensing temperature and/or the evaporating temperature reaches a target value. For example, the condensing temperature is set to 49 degrees C. and the evaporating temperature is set to 0 degrees C.

Note that each of the compressor 10 and the fan attached to the heat source side heat exchanger 12 is accommodated in the outdoor unit 1 and a controller (a second controller, not shown), which controls the rotation speed of the compressor 10 and/or the fan attached to heat source side heat exchanger 12 on the basis of the condensing temperature and/or the evaporating temperature, is disposed inside or in the vicinity of the outdoor unit 1.

As described above, configuration is such that the heat medium regulating units 14, the heat medium relay unit 3, and the outdoor unit 1 can be individually controlled by the corresponding controller. However, by controlling these cooperatively, it will be possible to perform an energy saving operation. For example, a cooperative control as below may be performed.

An explanatory cooperative control between the heat medium relay unit 3 and the heat medium regulating units 14 will be described.

When the opening degree of the relevant heat medium flow control device 25 is small (when the opening area of the passage is small), since the pressure loss in the passage is large, the corresponding pump 21 is operated with a rotation speed that is balanced at a large value. On the other hand, when the opening degree of the relevant heat medium flow control device 25 is large (when the opening area of the passage is large), since the pressure loss in the passage is small, it will be possible to reduce the rotation speed of the corresponding pump 21.

However, the pump 21 is accommodated in the heat medium relay unit 3, the heat medium flow control device 25 is accommodated in the heat medium regulating unit 14, and each is accommodated in a different housing and disposed at a separate position. Accordingly, in the air-conditioning apparatus 100, the controllers of each of the units are connected by wire or wireless allowing transmittance of information on the opening degree of the heat medium flow control device 25 from the controller of the heat medium regulating unit 14 to the controller of the heat medium relay unit 3 by means of communication.

On the basis of the information on the opening degree of the heat medium flow control device 25, the controller of the heat medium relay unit 3 changes the control target value of the first pressure sensor 32 so that the opening degree of the heat medium flow control device 25 becomes, for example, 85% of its full opening degree and controls the rotation speed of the pump 21. Note that when the heat medium regulating unit 14 is connected in plural numbers, the pump 21 may perform control on the basis of information on the heat medium flow control device 25 that has the largest opening degree among the heat medium flow control devices 25. Further, the first pressure sensor 32 does not have to be disposed. When performing individual control without disposing the first pressure sensor 32, the target rotation speed of the pump 21 may be controlled to become, for example, 60 Hz and when performing cooperative control, the rotation speed of the pump 21 may be controlled on the basis of information of the opening degree of the heat medium flow control device 25.

An explanatory cooperative control between the outdoor unit 1 and the heat medium relay unit 3 will be described.

Here, it is assumed that the temperature of the heat medium that is sent out to the use side heat exchanger 26 is controlled to be a constant value. The flow rate of the heat medium circulated to the use side heat exchanger 26 is determined in correlation with the detection pressure of the first pressure sensor 32 or the opening degree of the heat medium flow control device 25, and the temperature of the third temperature sensor 33 is the result of above. Accordingly, the rotation speed of the compressor 10 and/or the rotation speed of the fan attached to the heat source side heat exchanger 12 is controlled such that the detection temperature of the third temperature sensor 33 becomes a target value of, for example, 7 degrees C. during the cooling operation and 45 degrees C. during the heating operation.

However, the compressor 10 and the fan attached to the heat source side heat exchanger 12 is accommodated in the outdoor unit 1, the pump 21 is accommodated in the heat medium relay unit 3. The fans and the pump 21 are accommodated in different housings and are disposed at separate positions. Accordingly, in the air-conditioning apparatus 100, the controllers of each of the units are connected by wire or wireless allowing transmittance, from the controller of the heat medium relay unit 3 to the controller of the outdoor unit 1 by means of communication, of information on the control target value or the deviation value of the control target value of the condensing temperature and/or the evaporating temperature on the basis of the detection temperature of the third temperature sensor 33 and the detection temperature of the fourth temperature sensor 35.

The controller of the outdoor unit 1 performs control of the rotation speed of the compressor 10 and/or the fan attached to the heat source side heat exchanger 12 by changing the control target value of the condensing temperature and/or the evaporating temperature on the basis of the control target value or the deviation value of the control target value of the condensing temperature and/or the evaporating temperature.

As above, the air-conditioning apparatus is made more energy saving by performing cooperative control compared to when performing individual control of each housing. Note that controllability will be further improved by increasing the control interval of the pump compared to the control interval of the heat medium flow control device 25 and by further increasing the control interval of the condensing temperature and/or the evaporating temperature of the refrigerant. For example, the control interval of the pump 21 may be set three times or more of the control interval of the heat medium control device 25 and the control interval of the condensing temperature and/or the evaporating temperature of the refrigerant may be set three times or more of the control interval of the pump 21.

Furthermore, in the air-conditioning apparatus 100, in the case in which only the heating load or cooling load is generated in the use side heat exchangers 26, the corresponding first heat medium flow switching devices 22 and the corresponding second heat medium flow switching devices 23 are controlled so as to have a medium opening degree, such that the heat medium flows into both of the heat exchanger related to heat medium 15a and the heat exchanger related to heat medium 15b. Consequently, since both the heat exchanger related to heat medium 15a and the heat exchanger related to heat medium 15b can be used for the heating operation or the cooling operation, the heat transfer area can be increased, and accordingly the heating operation or the cooling operation can be efficiently performed.

In addition, in the case in which the heating load and the cooling load simultaneously occur in the use side heat exchangers 26, the first heat medium flow switching device 22 and the second heat medium flow switching device 23 corresponding to the use side heat exchanger 26 which performs the heating operation are switched to the passage connected to the heat exchanger related to heat medium 15b for heating, and the first heat medium flow switching device 22 and the second heat medium flow switching device 23 corresponding to the use side heat exchanger 26 which performs the cooling operation are switched to the passage connected to the heat exchanger related to heat medium 15a for cooling, so that the heating operation or cooling operation can be freely performed in each indoor unit 2.

Furthermore, each of the first heat medium flow switching devices 22 and the second heat medium flow switching devices 23 described in Embodiment may be any of the sort as long as they can switch passages, for example, a three-way valve capable of switching between three passages or a combination of two on-off valves and the like switching between two passages. Alternatively, components such as a stepping-motor-driven mixing valve capable of changing flow rates of three passages or electronic expansion valves capable of changing flow rates of two passages used in combination may be used as each of the first heat medium flow switching devices 22 and the second heat medium flow switching devices 23. In this case, water hammer caused when a passage is suddenly opened or closed can be prevented. Furthermore, while Embodiment has been described with respect to the case in which the heat medium flow control devices 25 each include a two-way valve, each of the heat medium flow control devices 25 may include a control valve having three passages and the valve may be disposed with a bypass piping that bypasses the corresponding use side heat exchanger 26.

Furthermore, as regards each of the heat medium flow control device 25, a stepping-motor-driven type that is capable of controlling a flow rate in the passage is preferably used. Alternatively, a two-way valve or a three-way valve whose one end is closed may be used. Alternatively, as regards each of the heat medium flow control device 25, a component, such as an on-off valve, which is capable of opening or closing a two-way passage, may be used while ON and OFF operations are repeated to control an average flow rate.

Furthermore, while each second refrigerant flow switching device 18 has been described as if it is a four-way valve, the device is not limited to this type. The device may be configured such that the refrigerant flows in the same manner using a plurality of two-way flow switching valves or three-way flow switching valves.

While the air-conditioning apparatus 100 according to Embodiment has been described with respect to the case in which the apparatus can perform the cooling and heating mixed operation, the apparatus is not limited to the case. Even in an apparatus that is configured by a single heat exchanger related to heat medium 15 and a single expansion device 16 that are connected to a plurality of parallel use side heat exchangers 26 and heat medium flow control devices 25, and even in an apparatus that is only capable of carrying out a cooling operation or a heating operation, the same advantages can be obtained.

In addition, it is needless to say that the same holds true for the case in which only a single use side heat exchanger 26 and a single heat medium flow control device 25 are connected. Moreover, it is needless to say that no problem will arise even if the heat exchanger related to heat medium 15 and the expansion device 16 acting in the same manner are arranged in plural numbers.

As regards the heat source side refrigerant, a single refrigerant, such as R-22 or R-134a, a near-azeotropic refrigerant mixture, such as R-410A or R-404A, a non-azeotropic refrigerant mixture, such as R-407C, a refrigerant, such as $CF_3CF=CH_2$, containing a double bond in its chemical formula and having a relatively low global warming potential, a mixture containing the refrigerant, or a natural refrigerant, such as $CO_2$ or propane, can be used. While the heat exchanger related to heat medium 15a or the heat exchanger related to heat medium 15b is operating for heating, a refrigerant that typically changes between two phases is condensed and liquefied and a refrigerant that turns into a supercritical state, such as $CO_2$, is cooled in the supercritical state. As for the rest, either of the refrigerant acts in the same manner and offers the same advantages. As for $CO_2$ and the like, since the high-pressure side turns into a supercritical state, the heat exchanger on the high-pressure side functions as a gas cooler. The largest temperature of specific heat at constant pressure in the heat exchanger may be defined as a representative temperature and control may be performed by using this as a pseudo-condensation temperature serving as an alternative of the condensing temperature of a refrigerant that changes in two phases.

As regards the heat medium, for example, brine (antifreeze), water, a mixed solution of brine and water, or a mixed solution of water and an additive with high anticorrosive effect can be used. In the air-conditioning apparatus 100, therefore, even if the heat medium leaks into the indoor space 7 through the indoor unit 2, because the heat medium used is highly safe, contribution to improvement of safety can be made.

Typically, a heat source side heat exchanger 12 and a use side heat exchanger 26 are provided with an air-moving device in which a current of air often facilitates condensation or evaporation. The structure is not limited to this case. For example, a heat exchanger, such as a panel heater, using radiation can also be used as the use side heat exchanger 26 and a water-cooled heat exchanger that transfers heat using water or antifreeze can also be used as the heat source side heat exchanger 12. In other words, as long as the heat exchanger is configured to be capable of transferring heat or removing heat, any type of heat exchanger, can be used as each of the heat source side heat exchanger 12 and the use side heat exchanger 26.

Embodiment has been described in which the number of heat exchangers related to heat medium 26 is two. As a matter of course, the arrangement is not limited to this case. Furthermore, description has been made illustrating a case in which there are two heat exchangers related to heat medium 15. As a matter of course, the arrangement is not limited to this case, and as long as it is configured so that cooling and/or heating of the heat medium can be carried out, the number may be any number. Furthermore, each of the number of pumps 21a and that of pumps 21b is not limited to one. A plurality of pumps having a small capacity may be arranged in parallel.

While Embodiment has been described with respect to the case in which the air-conditioning apparatus 100 includes the accumulator 19, the accumulator 19 may be omitted. In addition, while Embodiment has been described with respect to the case in which the air-conditioning apparatus 100 includes the check valves 13a to 13d, these components are not essential parts. It is therefore needless to say that even if the accumulator 19 and the check valves 13a to 13d are omitted, the air-conditioning apparatus will act in the same manner and offer the same advantages.

As described above, the air-conditioning apparatus 100 according to Embodiment can perform a safe and high energy-saving operation by controlling the heat medium flow switching devices (the first heat medium flow switching devices 22 and the second heat medium flow switching devices 23), the heat medium flow control devices 25, and the pumps 21 on the heat medium side. Further, the air-conditioning apparatus 100 can reduce the connecting pipings between the outdoor unit 1 and the heat medium relay unit 3, and between the heat medium relay unit 3 and the indoor units 2, thus increase ease of construction. Furthermore, the air-conditioning apparatus 100 can facilitate installation work in a structure that has already completed its water pipings.

REFERENCE SIGNS LIST 1 outdoor unit; 2 indoor unit; 2a indoor unit; 2b indoor unit; 2c indoor unit; 2d indoor unit; 3 heat medium relay unit; 4 refrigerant piping; 4a first connecting piping; 4b second connecting piping; 5 piping; 5a main piping (vertical piping); 5b branch piping (horizontal piping); 6 outdoor space; 7 indoor space; 8 space; 9 structure; 10 compressor; 11 first refrigerant flow switching device; 12 heat source side heat exchanger; 13a check valve; 13b check valve; 13c check valve; 13d check valve; 14 heat medium regulating unit; 15 heat exchanger related to heat medium; 15a heat exchanger related to heat medium; 15b heat exchanger related to heat medium; 16 expansion device; 16a expansion device; 16b expansion device; 17 on-off device; 17a on-off device; 17b on-off device; 18 second refrigerant flow switching device; 18a second refrigerant flow switching device; 18b second refrigerant flow switching device; 19 accumulator; 21 pump; 21a pump; 21b pump; 22 first heat medium flow switching device; 22a first heat medium flow switching device; 22b first heat medium flow switching device; 22c first heat medium flow switching device; 22d first heat medium flow switching device; 23 second heat medium flow switching device; 23a second heat medium flow switching device; 23b second heat medium flow switching device; 23c second heat medium flow switching device; 23d second heat medium flow switching device; 25 heat medium flow control device; 25a heat medium flow control device; 25b heat medium flow control device; 25c heat medium flow control device; 25d heat medium flow control device; 26 use side heat exchanger; 26a use side heat exchanger; 26b use side heat exchanger; 26c use side heat exchanger; 26d use side heat exchanger; 31 first temperature sensor; 31a first temperature sensor; 31b first temperature sensor; 31c first temperature sensor; 31d first temperature sensor; 32 first pressure sensor; 32a first pressure sensor; 32b first pressure sensor; 33 third temperature sensor; 33a third temperature sensor; 33b third temperature sensor; 34 second temperature sensor; 34a second temperature sensor; 34b second temperature sensor; 34c second temperature sensor; 34d second temperature sensor; 35 fourth temperature sensor; 35a fourth temperature sensor; 35b fourth temperature sensor; 35c fourth temperature sensor; 35d fourth temperature sensor; 36 second pressure sensor 100 air-conditioning apparatus; A refrigerant circuit; B heat medium circuit.

The invention claimed is:

1. An air-conditioning apparatus, comprising:
    a refrigerant circuit including a compressor, a heat source side heat exchanger, an expansion device, and a refrigerant side passage of a heat exchanger related to heat medium connected by piping in series, the refrigerant circuit circulating a heat source side refrigerant; and
    a heat medium circuit including a heat medium side passage of the heat exchanger related to heat medium, a pump, a first heat medium flow switching device, a use side heat exchanger, a heat medium flow control device, and a second heat medium flow switching device connected by piping in series, the heat medium circuit circulating a heat medium, wherein
    the compressor and the heat source side heat exchanger are accommodated in an outdoor unit,
    the heat exchanger related to heat medium, the expansion device, and the pump are accommodated in a heat medium relay unit,
    the first heat medium flow switching device and the second heat medium flow switching device are accommodated in a heat medium regulating unit,
    the use side heat exchanger is accommodated in an indoor unit,
    the heat medium flow control device is accommodated in the heat medium regulating unit or the indoor unit,
    the outdoor unit, the heat medium relay unit, the heat medium regulating unit, and the indoor unit have separately different casings,
    the outdoor unit and the heat medium relay unit are connected with at least two refrigerant pipings,
    the heat medium relay unit and the heat medium regulating unit are connected with four heat medium pipings,
    the heat medium regulating unit and the indoor unit are connected with two heat medium pipings,
    the air-conditioning apparatus further comprises:
    a first controller configured to control a rotation speed of the pump; and
    a second controller configured to control a rotation speed of the compressor on the basis of a target condensing temperature, or a target pseudo-condensation temperature when a high-pressure side is in a supercritical state or a target evaporating temperature, and
    the first controller and the second controller are connected by wire or wireless allowing cooperative control.

2. The air-conditioning apparatus of claim 1, wherein the four heat medium pipings connecting the heat medium relay unit with the heat medium regulating unit are constituted by four vertical pipings that are disposed in a substantially vertical direction and by four horizontal pipings that are disposed in a substantially horizontal direction.

3. The air-conditioning apparatus of claim 1, wherein the heat medium relay unit is connected to one or a plurality of heat medium regulating units and the one or plurality of the heat medium regulating units is connected to one or a plurality of indoor units.

4. The air-conditioning apparatus of claim 1, further comprising:
    a third controller that controls an opening degree of the heat medium flow control device on the basis of a temperature of the heat medium flowing in and out of the use side heat exchanger, wherein
    the third controller, the first controller, and the second controller are communicably connected to each other by wire or wireless,
    the first controller controls the rotation speed of the pump so that the opening degree of the heat medium flow control device approaches a target value on the basis of information on the opening degree of the heat medium flow control device from the third controller.

5. The air-conditioning apparatus of claim 4, wherein the heat medium regulating unit is provided with a first temperature sensor that detects a temperature of the heat medium flowing into the use side heat exchanger and a second temperature sensor that detects a temperature of the heat medium flowing out of the use side heat exchanger, and
    the third controller controls the opening degree of the heat medium flow control device so that a temperature difference between a detection temperature of the first temperature sensor and a detection temperature of the second temperature sensor approaches a target value.

6. The air-conditioning apparatus of claim 4, wherein the heat medium relay unit is provided with a pressure sensor that detects a pressure of the heat medium flowing into the pump or a pressure of the heat medium flowing out of the pump,
    the first controller changes a control target value of the pressure sensor on the basis of information on the opening degree of the heat medium flow control device.

7. The air-conditioning apparatus of claim 4, wherein a control interval of the pump is larger than a control interval of the heat medium flow control device and a control interval of the target condensing temperature and/or the target evaporating temperature of the heat source side refrigerant is further larger.

8. The air-conditioning apparatus of claim 7, wherein the control interval of the pump is three times or more of the control interval of the heat medium control device and the control interval of the target condensing temperature and/or the target evaporating temperature of the heat source side refrigerant is three times or more of the control interval of the pump.

* * * * *